(12) United States Patent
Iyer et al.

(10) Patent No.: US 12,189,529 B2
(45) Date of Patent: Jan. 7, 2025

(54) LCS DATA PROVISIONING SYSTEM

(71) Applicant: Dell Products L.P., Round Rock, TX (US)

(72) Inventors: Shyamkumar T. Iyer, Cedar Park, TX (US); Xiangping Chen, Sherborn, MA (US); Xunce Zhou, Shrewsbury, MA (US); William Price Dawkins, Lakeway, TX (US)

(73) Assignee: Dell Products L.P., Round Rock, TX (US)

( * ) Notice: Subject to any disclaimer, the term of this patent is extended or adjusted under 35 U.S.C. 154(b) by 181 days.

(21) Appl. No.: 17/875,474

(22) Filed: Jul. 28, 2022

(65) Prior Publication Data

US 2024/0037032 A1 Feb. 1, 2024

(51) Int. Cl.
*G06F 12/08* (2016.01)
*G06F 3/06* (2006.01)
*G06F 12/0802* (2016.01)

(52) U.S. Cl.
CPC ........ *G06F 12/0802* (2013.01); *G06F 3/0611* (2013.01); *G06F 3/0655* (2013.01); *G06F 3/067* (2013.01); *G06F 2212/60* (2013.01)

(58) Field of Classification Search
CPC .... G06F 3/0611; G06F 3/0634; G06F 3/0662; G06F 3/067; G06F 3/0659; G06F 12/0802; G06F 12/0806; G06F 2212/60; H04L 67/55; H04L 67/568; H04L 67/1097
See application file for complete search history.

(56) References Cited

U.S. PATENT DOCUMENTS

| | | | |
|---|---|---|---|
| 9,697,130 B2* | 7/2017 | Karippara | G06F 9/50 |
| 9,703,951 B2 | 7/2017 | Patel et al. | |
| 10,180,908 B2 | 1/2019 | Li et al. | |
| 2016/0142487 A1* | 5/2016 | Mettu | H04L 67/1097 709/219 |
| 2017/0371787 A1* | 12/2017 | Kalyanasundharam | G06F 12/0828 |
| 2018/0300065 A1* | 10/2018 | Talwar | G06F 12/0868 |
| 2022/0091990 A1* | 3/2022 | Roberts | G06F 12/0888 |
| 2023/0315695 A1* | 10/2023 | Pathan | G06F 16/178 707/821 |

* cited by examiner

*Primary Examiner* — Khoa D Doan
*Assistant Examiner* — Julian S Mendel
(74) *Attorney, Agent, or Firm* — Joseph Mencher

(57) ABSTRACT

A Logically Composed System (LCS) data provisioning system includes an orchestrator device that includes a cache subsystem and that is coupled to client devices and storage subsystem(s). When the orchestrator device identifies that a first client device has exclusive access to the storage subsystem(s), it activates read data caching for the storage subsystem(s). The orchestrator device then receives a first read request from the first client device that is directed to first data that is stored in the storage subsystem(s) and, in response, retrieves the first data from the cache subsystem and provides the first data to the first client device. When the orchestrator device identifies that the first client device no longer has exclusive access to the storage subsystem(s), it deactivates the read data caching for the storage subsystem(s).

20 Claims, 26 Drawing Sheets

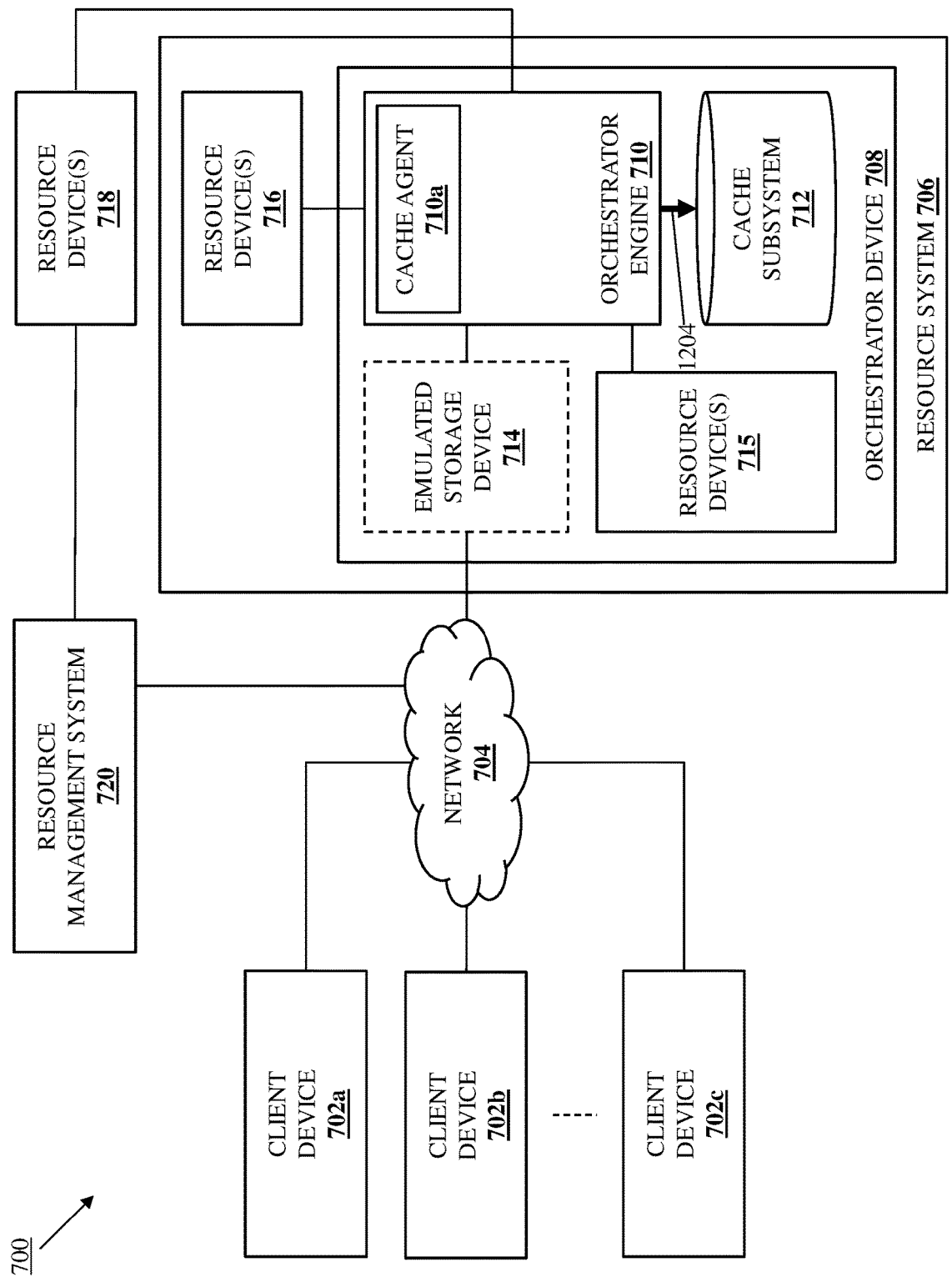

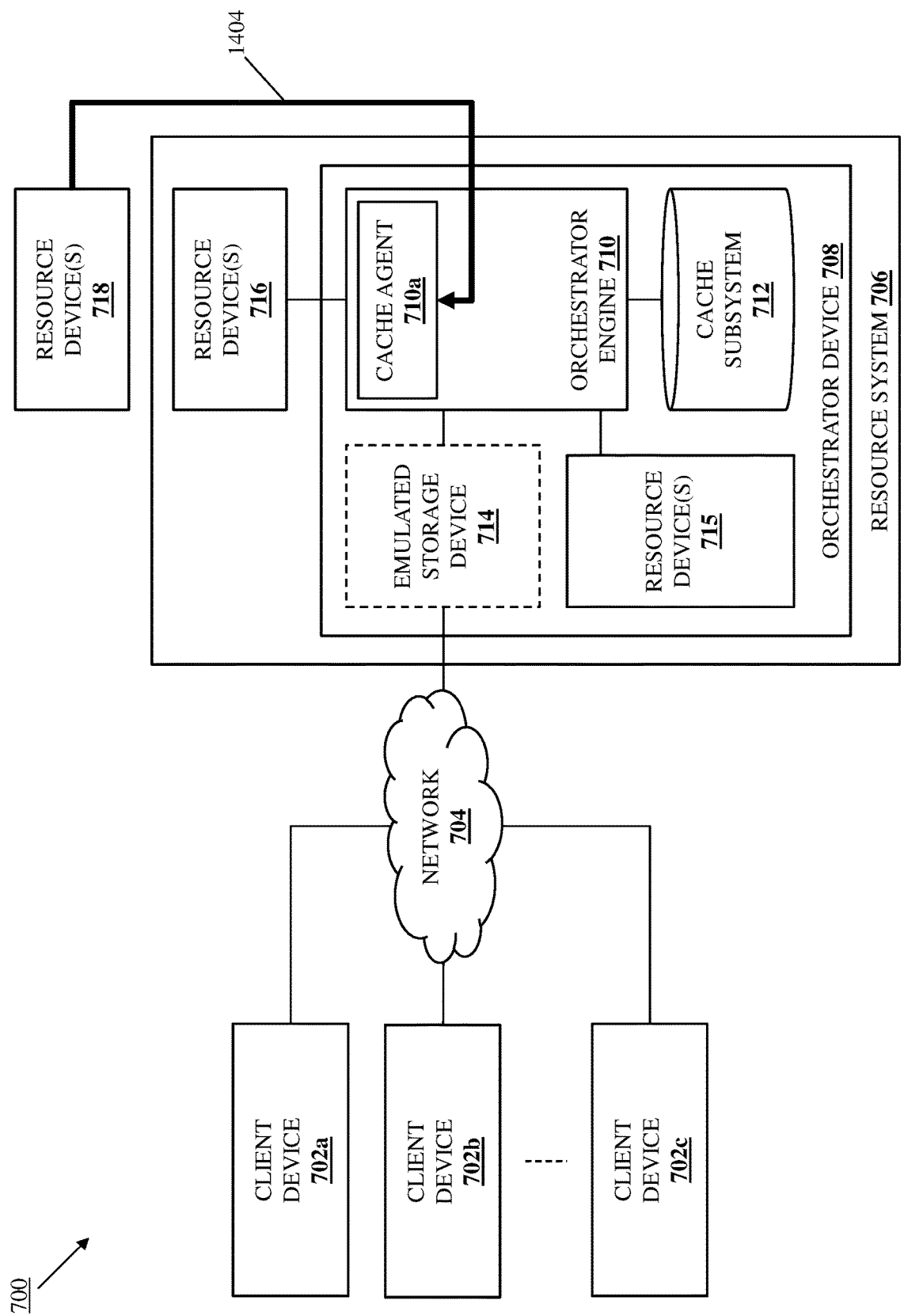

LCS DATA PROVISIONING SYSTEM

BACKGROUND

The present disclosure relates generally to information handling systems, and more particularly to provisioning data via a Logically Composed System (LCS) that is provided using an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

While conventional information handling systems such as, for example, server devices and/or other computing devices known in the art have traditionally been provided with particular information handling systems components that configure it to satisfy one or more use cases, new computing paradigms provide for the allocation of resources from information handling systems and/or information handling system components for use in Logically Composed Systems (LCSs) that may be composed as needed to satisfy any computing intent/workload, and then decomposed such that those resources may be utilized in other LCSs. As such, users of the LCSs may be provided with LCSs that meet their current needs for any particular workload they require.

For example, LCSs are often provided using Bare Metal Server (BMS) systems or other resource systems known in the art, with resource devices included within and/or outside of those resource systems (e.g., processing devices and memory devices on a motherboard in the BMS system used to provide an Operating System (OS) for the LCS, storage devices, networking devices, etc.) used to perform the functionality for the LCSs, and often dynamically changing over the time period in which the LCS is provided. Furthermore, orchestrator devices in the BMS systems may orchestrate the provisioning of those LCSs while also including resource devices that may be utilized to provide the functionality of those LCSs. To provide a specific example, an orchestrator device may utilize storage devices provided by any of the resource devices discussed above to provide primary storage services/functionality for the LCS (e.g., the storage of data), and may also utilize compression/decompression hardware, encryption/decryption hardware, and/or other resource devices coupled to or included on the orchestrator device to perform supplemental storage services/functionality for the LCS (e.g., compression/decompression, encryption/decryption, etc.).

As will be appreciated by one of skill in the art in possession of the present disclosure, the provisioning of the supplemental storage services/functionality discussed above can introduce latency during operations associated with the storage devices. For example, the decompression and/or decryption of data requested in a read request can introduce latency in the return of that data from the storage devices. Furthermore, the primary storage services/functionality provided via the resource devices discussed above is often shared between multiple LCSs, and thus the caching of data to eliminate such latency can raise issues, as caching data with multiple host paths requires relatively complicated data coordination algorithms to ensure cache coherency, and/or otherwise incurs relatively high amounts of storage operation overhead.

Accordingly, it would be desirable to provide an LCS data provisioning system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide an orchestrator engine that is configured to: identify that a first client device has exclusive access to at least one storage subsystem; activate, in response to identifying that the first client device has exclusive access to the at least one storage subsystem, read data caching for the at least one storage subsystem; receive, from the first client device, a first read request that is directed to first data that is stored in the at least one storage subsystem; retrieve, in response to receiving the first read request, the first data from the cache subsystem; provide the first data to the first client device; identify that the first client device no longer has exclusive access to the at least one storage subsystem; and deactivate, in response to determining that the first client device no longer has exclusive access to the at least one storage subsystem, the read data caching for the at least one storage subsystem.

BRIEF DESCRIPTION OF THE DRAWINGS

FIG. 12C is a schematic view illustrating an embodiment of the LCS data provisioning system of FIG. 7 operating during the method of FIG. 8.

FIG. 14B is a schematic view illustrating an embodiment of the LCS data provisioning system of FIG. 7 operating during the method of FIG. 8.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
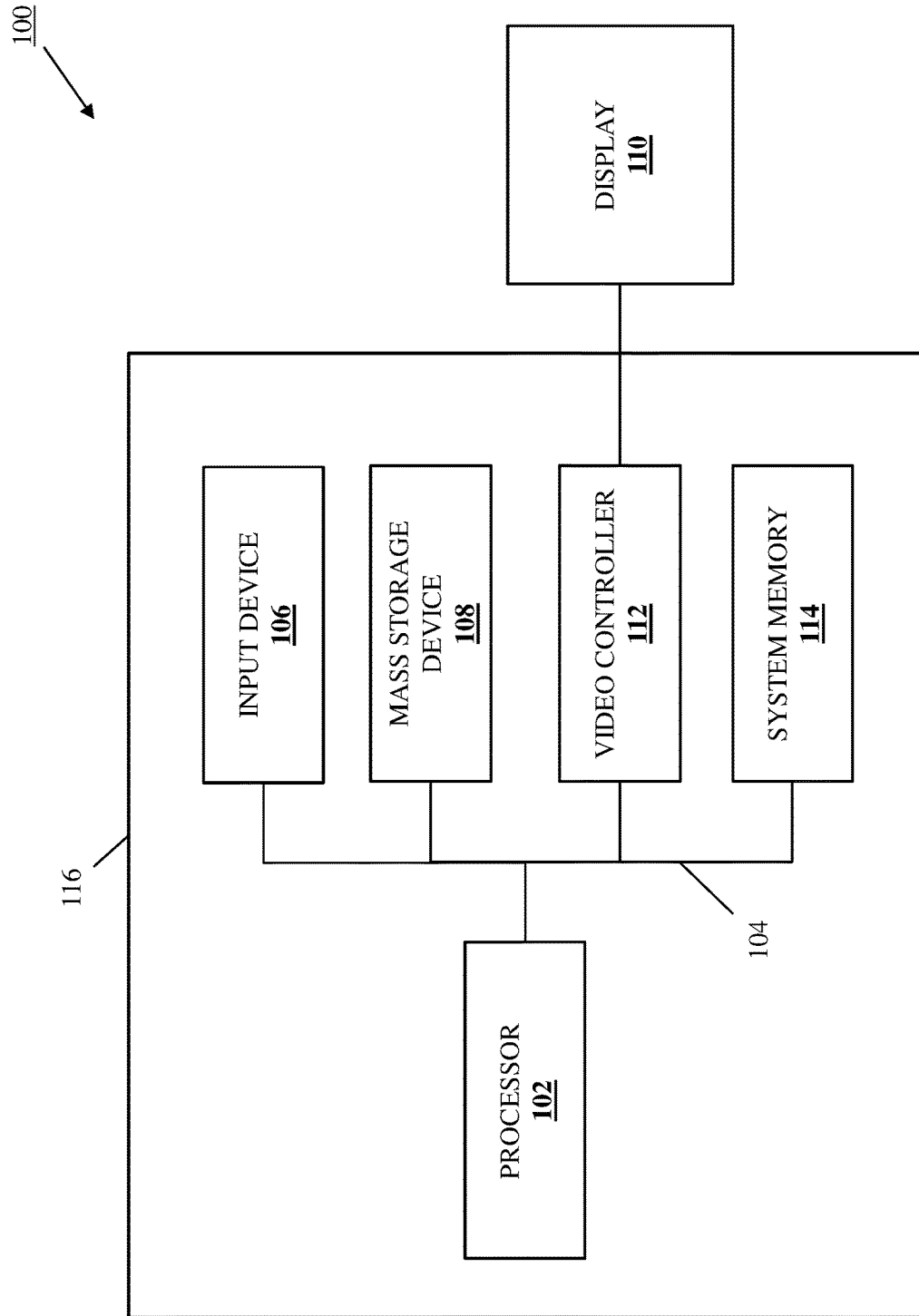
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

As discussed in further detail below, the Logically Composed System (LCS) data provisioning systems and methods of the present disclosure may be utilized with LCSs, which one of skill in the art in possession of the present disclosure will recognize may be provided to users as part of an intent-based, as-a-Service delivery platform that enables multi-cloud computing while keeping the corresponding infrastructure that is utilized to do so "invisible" to the user in order to, for example, simplify the user/workload performance experience. As such, the LCSs discussed herein enable relatively rapid utilization of technology from a relatively broader resource pool, optimize the allocation of resources to workloads to provide improved scalability and efficiency, enable seamless introduction of new technologies and value-add services, and/or provide a variety of other benefits that would be apparent to one of skill in the art in possession of the present disclosure.

Figure 2:
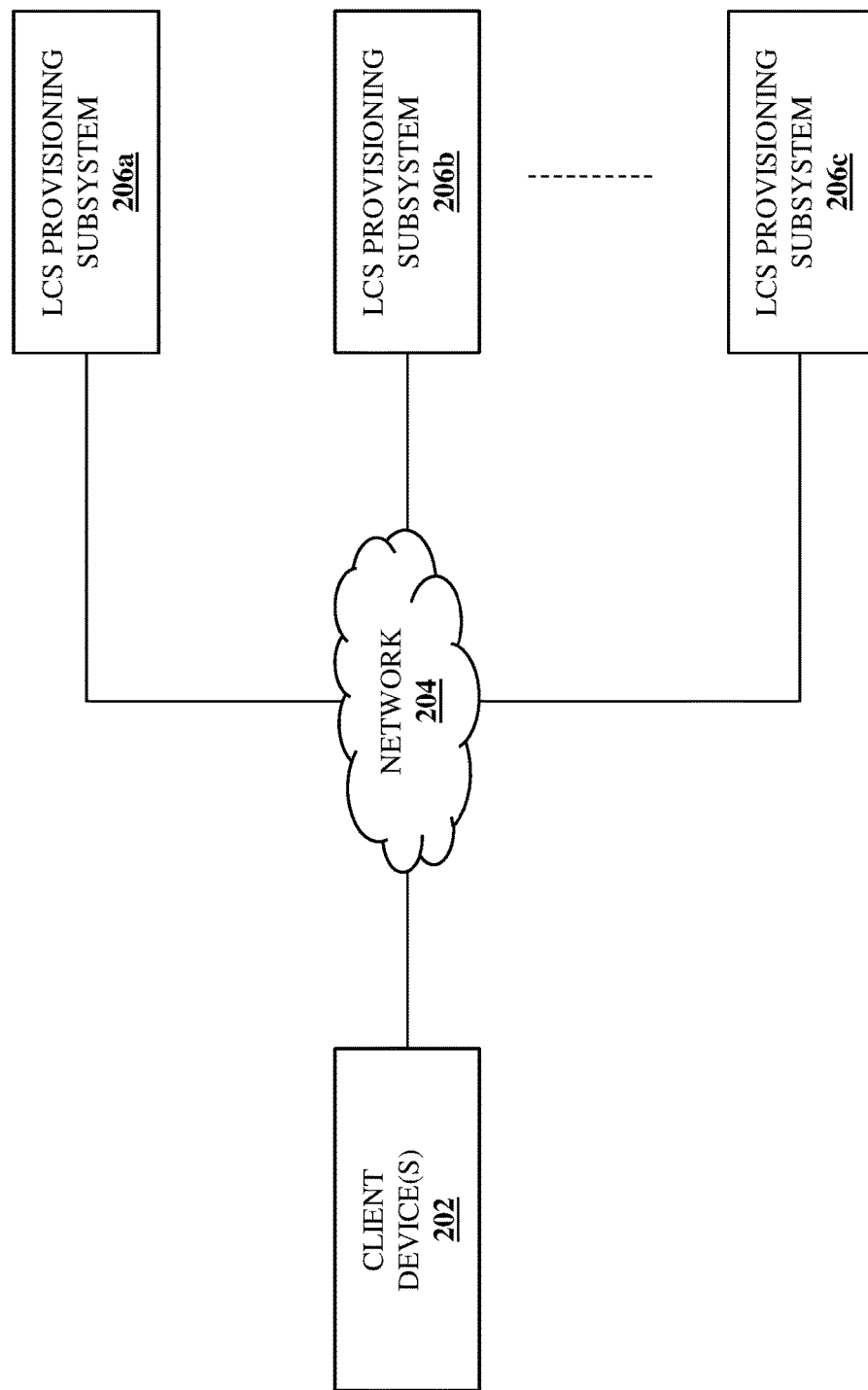
FIG. 2 is a schematic view illustrating an embodiment of an LCS provisioning system.

With reference to FIG. 2, an embodiment of a LCS provisioning system 200 is illustrated that may be utilized with the LCS data provisioning systems and methods of the present disclosure. In the illustrated embodiment, the LCS provisioning system 200 includes one or more client devices 202. In an embodiment, any or all of the client devices may be provided by the IHS 100 discussed above with reference to FIG. 1 and/or may include some or all of the components of the IHS 100, and in specific examples may be provided by desktop computing devices, laptop/notebook computing devices, tablet computing devices, mobile phones, and/or any other computing device known in the art. However, while illustrated and discussed as being provided by specific computing devices, one of skill in the art in possession of the present disclosure will recognize that the functionality of the client device(s) 202 discussed below may be provided by other computing devices that are configured to operate similarly as the client device(s) 202 discussed below, and that one of skill in the art in possession of the present disclosure would recognize as utilizing the LCSs described herein. As illustrated, the client device(s) 202 may be coupled to a network 204 that may be provided by a Local Area Network (LAN), the Internet, combinations thereof, and/or any of network that would be apparent to one of skill in the art in possession of the present disclosure.

As also illustrated in FIG. 2, a plurality of LCS provisioning subsystems 206a, 206b, and up to 206c are coupled to the network 204 such that any or all of those LCS provisioning subsystems 206a-206c may provide LCSs to the client device(s) 202 as discussed in further detail below. In an embodiment, any or all of the LCS provisioning subsystems 206a-206c may include one or more of the IHS 100 discussed above with reference to FIG. 1 and/or may include some or all of the components of the IHS 100. For example, in some of the specific examples provided below, each of the LCS provisioning subsystems 206a-206c may be provided by a respective datacenter or other computing device/computing component location (e.g., a respective one of the "clouds" that enables the "multi-cloud" computing discussed above) in which the components of that LCS provisioning subsystem are included. However, while a specific configuration of the LCS provisioning system 200 (e.g., including multiple LCS provisioning subsystems 206a-206c) is illustrated and described, one of skill in the art in possession of the present disclosure will recognize that other configurations of the LCS provisioning system 200 (e.g., a single LCS provisioning subsystem, LCS provisioning subsystems that span multiple datacenters/computing device/computing component locations, etc.) will fall within the scope of the present disclosure as well.

Figure 3:
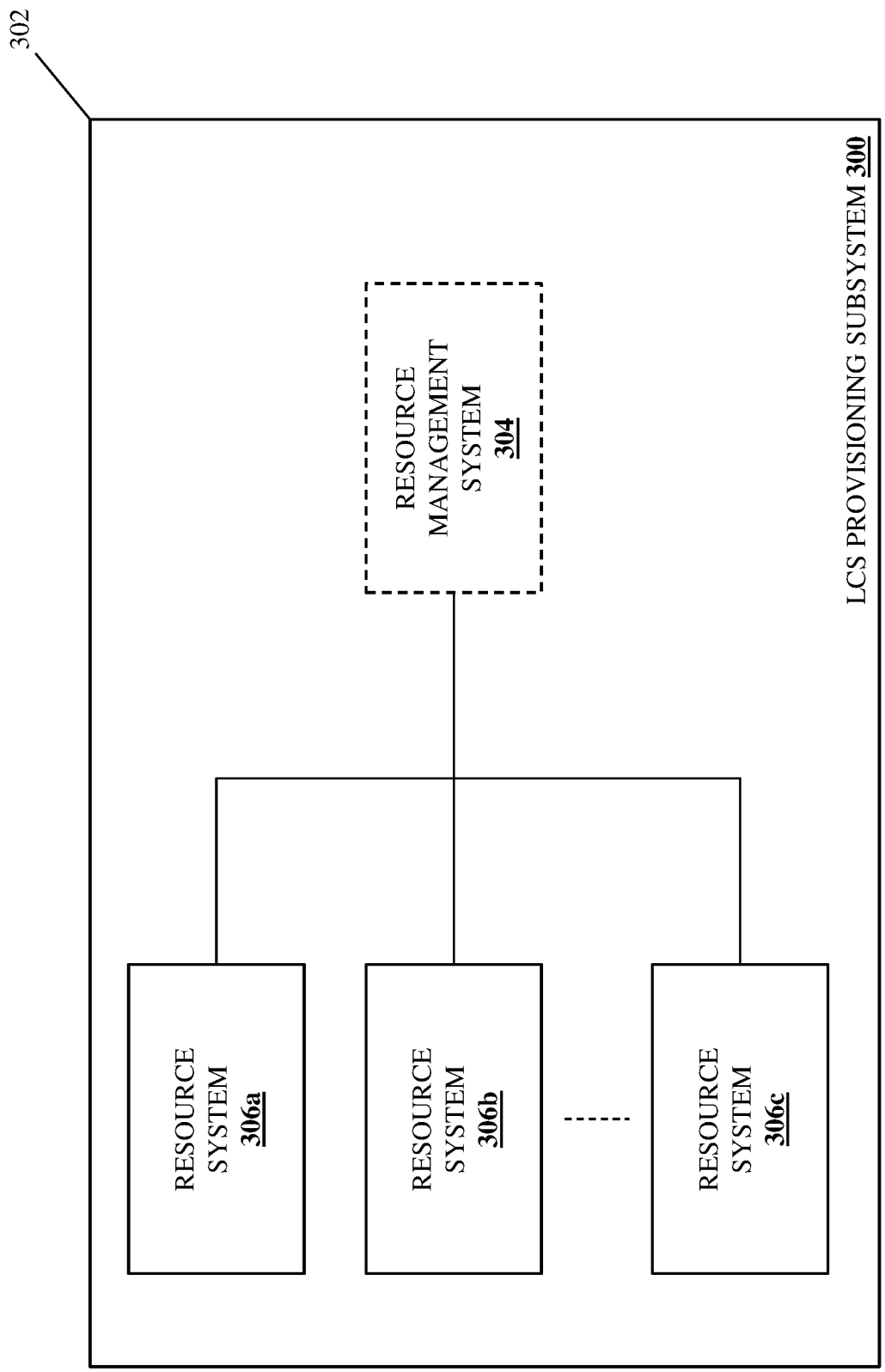
FIG. 3 is a schematic view illustrating an embodiment of an LCS provisioning subsystem that may be included in the LCS provisioning system of FIG. 2.

With reference to FIG. 3, an embodiment of an LCS provisioning subsystem 300 is illustrated that may provide any of the LCS provisioning subsystems 206a-206c discussed above with reference to FIG. 2. As such, the LCS provisioning subsystem 300 may include one or more of the IHS 100 discussed above with reference to FIG. 1 and/or may include some or all of the components of the IHS 100, and in the specific examples provided below may be provided by a datacenter or other computing device/computing component location in which the components of the LCS provisioning subsystem 300 are included. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

In the illustrated embodiment, the LCS provisioning subsystem 300 is provided in a datacenter 302, and includes a resource management system 304 coupled to a plurality of resource systems 306a, 306b, and up to 306c. In an embodiment, any of the resource management system 304 and the resource systems 306a-306c may be provided by the IHS 100 discussed above with reference to FIG. 1 and/or may include some or all of the components of the IHS 100. In the specific embodiments provided below, each of the resource management system 304 and the resource systems 306a-306c may include an orchestrator device. In some embodiments, the orchestrator device may be provided by the System Control Processor (SCP) device or Data Processing Unit (DPU) device discussed below, and may be conceptualized as an "enhanced" SmartNIC device that may be configured to perform functionality that is not available in conventional SmartNIC devices such as, for example, the resource management functionality, LCS provisioning functionality, and/or other SCP/DPU functionality described herein. However, while described as being provided by an SCP device or DPU device, one of skill in the art in possession of the present disclosure will appreciate how the orchestrator device of the present disclosure may also be provided by other devices that have been configured to perform the orchestrator functionality described below while remaining within the scope of the present disclosure as well.

In an embodiment, any of the resource systems 306a-306c may include any of the resources described below coupled to an SCP device or DPU device that is configured to facilitate management of those resources by the resource management system 304. Furthermore, the SCP device or DPU device included in the resource management system 304 may provide an SCP Manager (SCPM) subsystem or DPU Manager (DPUM) subsystem that is configured to manage the SCP devices or DPU devices in the resource systems 306a-306c, and that performs the functionality of the resource management system 304 described below. In some examples, the resource management system 304 may be provided by a "stand-alone" system (e.g., that is provided in a separate chassis from each of the resource systems 306a-306c), and the SCPM subsystem or DPUM subsystem discussed below may be provided by a dedicated SCP device, DPU device, processing/memory resources, and/or other components in that resource management system 304. However, in other embodiments, the resource management system 304 may be provided by one of the resource systems 306a-306c (e.g., it may be provided in a chassis of one of the resource systems 306a-306c), and the SCPM subsystem or DPUM subsystem may be provided by an SCP device, DPU device, processing/memory resources, and/or any other any other components in that resource system.

As such, the resource management system 304 is illustrated with dashed lines in FIG. 3 to indicate that it may be a stand-alone system in some embodiments, or may be provided by one of the resource systems 306a-306c in other embodiments. Furthermore, one of skill in the art in possession of the present disclosure will appreciate how SCP devices or DPU devices in the resource systems 306a-306c may operate to "elect" or otherwise select one or more of those SCP devices or DPU devices to operate as the SCPM subsystem or DPUM subsystem that provides the resource management system 304 described below. However, while a specific configuration of the LCS provisioning subsystem 300 is illustrated and described, one of skill in the art in possession of the present disclosure will recognize that other configurations of the LCS provisioning subsystem 300 will fall within the scope of the present disclosure as well.

Figure 4:
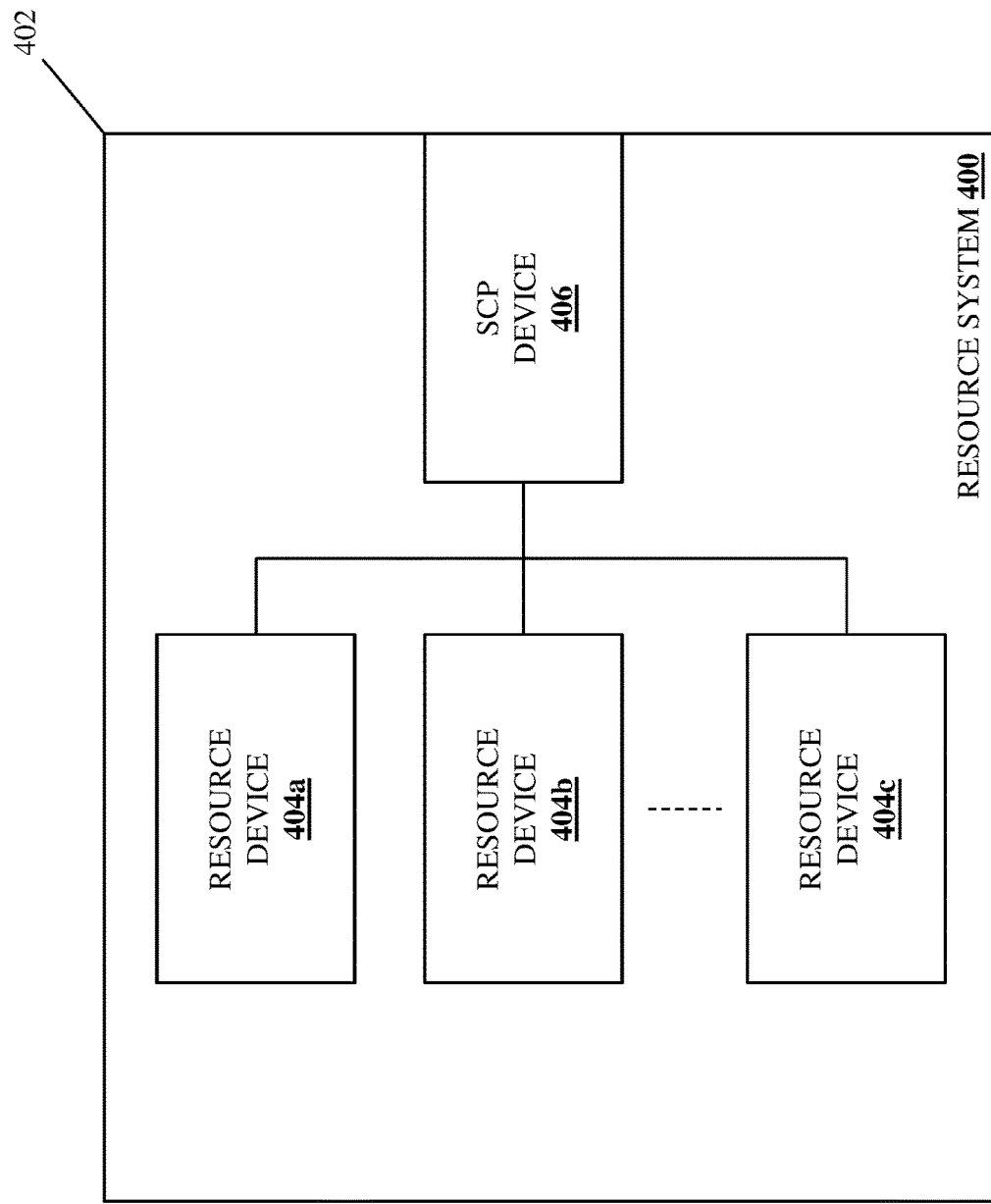
FIG. 4 is a schematic view illustrating an embodiment of a resource system that may be included in the LCS provisioning subsystem of FIG. 3.

With reference to FIG. 4, an embodiment of a resource system 400 is illustrated that may provide any or all of the resource systems 306a-306c discussed above with reference to FIG. 3. In an embodiment, the resource system 400 may be provided by the IHS 100 discussed above with reference to FIG. 1 and/or may include some or all of the components of the IHS 100. In the illustrated embodiment, the resource system 400 includes a chassis 402 that houses the components of the resource system 400, only some of which are illustrated and discussed below. In the illustrated embodiment, the chassis 402 houses an SCP device 406, but one of skill in the art in possession of the present disclosure will appreciate how the SCP device 406 may be replaced by the DPU device described herein while remaining within the scope of the present disclosure, with that DPU device provided by BLUEFIELD® DPU devices available from NVIDIA® Corporation of Santa Clara, California, United States, DPU devices available from FUNGIBLE® Inc. of Santa Clara, California, United States, and/or other DPU devices known in the art.

In an embodiment, the SCP device 406 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an SCP engine that is configured to perform the functionality of the SCP engines and/or SCP devices discussed below. Furthermore, the SCP device 406 may also include any of a variety of SCP components (e.g., hardware/software) that are configured to enable any of the SCP functionality described below.

In the illustrated embodiment, the chassis 402 also houses a plurality of resource devices 404a, 404b, and up to 404c, each of which is coupled to the SCP device 406. For example, the resource devices 404a-404c may include processing systems (e.g., first type processing systems such as those available from INTEL® Corporation of Santa Clara, California, United States, second type processing systems such as those available from ADVANCED MICRO DEVICES (AMD)® Inc. of Santa Clara, California, United States, Advanced Reduced Instruction Set Computer (RISC) Machine (ARM) devices, Graphics Processing Unit (GPU) devices, Tensor Processing Unit (TPU) devices, Field Programmable Gate Array (FPGA) devices, accelerator devices, etc.); memory systems (e.g., Persistence MEMory (PMEM) devices (e.g., solid state byte-addressable memory devices that reside on a memory bus), etc.); storage devices (e.g., Non-Volatile Memory express over Fabric (NVMe-oF) storage devices, Just a Bunch Of Flash (JBOF) devices, etc.); networking devices (e.g., Network Interface Controller (NIC) devices, etc.); and/or any other devices that one of skill in the art in possession of the present disclosure would recognize as enabling the functionality described as being enabled by the resource devices 404a-404c discussed below. As such, the resource devices 404a-404c in the resource systems 306a-306c/400 may be considered a "pool" of resources that are available to the resource management system 304 for use in composing LCSs.

To provide a specific example, the SCP devices described herein may provide a "trusted" orchestrator device that operates as a Root-of-Trust (RoT) for their corresponding resource devices/systems, to provide an intent management engine for managing the workload intents discussed below, to perform telemetry generation and/or reporting operations for their corresponding resource devices/systems, to perform identity operations for their corresponding resource devices/systems, provide an image boot engine (e.g., an operating system image boot engine) for LCSs composed using a processing system/memory system controlled by that SCP device, and/or perform any other operations that one of skill in the art in possession of the present disclosure would recognize as providing the functionality described below. For example, the SCP device 406 may be "trusted" because it provides a root-of-trust for its corresponding resource devices/systems, and thus may be configured with restricted access to its hardware and/or software that has been validated and is maintained within a closed-loop infrastructure. For example, the SCP device 704 may run cryptographically signed software validated via the root-of-trust, with connectivity to both a BMS BMC and the SCPM device discussed above, and with all communications internal to the closed-loop infrastructure secured to ensure their veracity.

To contrast, the DPU device described herein may provide an "untrusted" orchestrator device that may include similar hardware/software/capabilities as the SCP device 406, but a user of the SCP device 406 may not be able to access such hardware/software/capabilities on the SCP device 406 unless it is part of/connected to an authorized network. As will be appreciated by one of skill in the art in possession of the present disclosure, the DPU device may be "untrusted" due to it having not been manufactured by a manufacturer of the computing system 202 (e.g., it may be obtained by the manufacturer of the computing system 202 from any of a variety of vendors that are not controlled by the manufacturer of the computing system 202), it having not been secured based on a lack of control over the DPU device 204 by a manufacturer of the computing system 202, and/or based on other "untrusted" factors that would be apparent to one of skill in the art in possession of the present disclosure. As will be appreciated by one of skill in the art in possession of the present disclosure, a DPU device software stack differs from a conventional Input/Output (TO) card that uses firmware configured to provide dedicated I/O and management functions, as in addition to firmware, the DPU device software stack will include a DPU operating system and a user space that is customizable to configure/program the DPU device to present resource devices to an operating system in the computing system 202 outside the control of the manufacturer of the computing system, which can render that DPU device "untrusted" in many scenarios.

As discussed below, the SCP devices and/or DPU devices described herein may include Software-Defined Storage (SDS) subsystems, inference subsystems, data protection subsystems, Software-Defined Networking (SDN) subsystems, trust subsystems, data management subsystems, compression subsystems, encryption subsystems, and/or any other hardware/software described herein that may be allocated to an LCS that is composed using the resource devices/systems controlled by that SCP device. However, while an SCP device is illustrated and described as performing the functionality discussed below, one of skill in the art in possession of the present disclosure will appreciated that functionality described herein may be enabled on the DPU devices discussed above, as well as other devices with similar functionality, while remaining within the scope of the present disclosure as well.

Thus, the resource system 400 may include the chassis 402 including the SCP device 406 connected to any combinations of resource devices. To provide a specific embodiment, the resource system 400 may provide a "Bare Metal Server" that one of skill in the art in possession of the present disclosure will recognize may be a physical server system that provides dedicated server hosting to a single tenant, and thus may include the chassis 402 housing a processing system and a memory system, the SCP device 406, as well as any other resource devices that would be apparent to one of skill in the art in possession of the present disclosure. However, in other specific embodiments, the resource system 400 may include the chassis 402 housing the SCP device 406 coupled to particular resource devices 404a-404c. For example, the chassis 402 of the resource system 400 may house a plurality of processing systems (i.e., the resource devices 404a-404c) coupled to the SCP device 406. In another example, the chassis 402 of the resource system 400 may house a plurality of memory systems (i.e., the resource devices 404a-404c) coupled to the SCP device 406. In another example, the chassis 402 of the resource system 400 may house a plurality of storage devices (i.e., the resource devices 404a-404c) coupled to the SCP device 406. In another example, the chassis 402 of the resource system 400 may house a plurality of networking devices (i.e., the resource devices 404a-404c) coupled to the SCP device 406. However, one of skill in the art in possession of the present disclosure will appreciate that the chassis 402 of the resource system 400 housing a combination of any of the resource devices discussed above will fall within the scope of the present disclosure as well.

As discussed in further detail below, the SCP device 406 in the resource system 400 will operate with the resource management system 304 (e.g., an SCPM subsystem) to allocate any of its resources devices 404a-404c for use in a providing an LCS. Furthermore, the SCP device 406 in the resource system 400 may also operate to allocate SCP hardware and/or perform functionality, which may not be available in a resource device that it has allocated for use in providing an LCS, in order to provide any of a variety of functionality for the LCS. For example, the SCP engine and/or other hardware/software in the SCP device 406 may be configured to perform encryption functionality, compression functionality, and/or other storage functionality known in the art, and thus if that SCP device 406 allocates storage device(s) (which may be included in the resource devices it controls) for use in a providing an LCS, that SCP device 406 may also utilize its own SCP hardware and/or software to perform that encryption functionality, compression functionality, and/or other storage functionality as needed for the LCS as well. However, while particular SCP-enabled storage functionality is described herein, one of skill in the art in possession of the present disclosure will appreciate how the SCP devices 406 described herein may allocate SCP hardware and/or perform other enhanced functionality for an LCS provided via allocation of its resource devices 404a-404c while remaining within the scope of the present disclosure as well.

Figure 5:
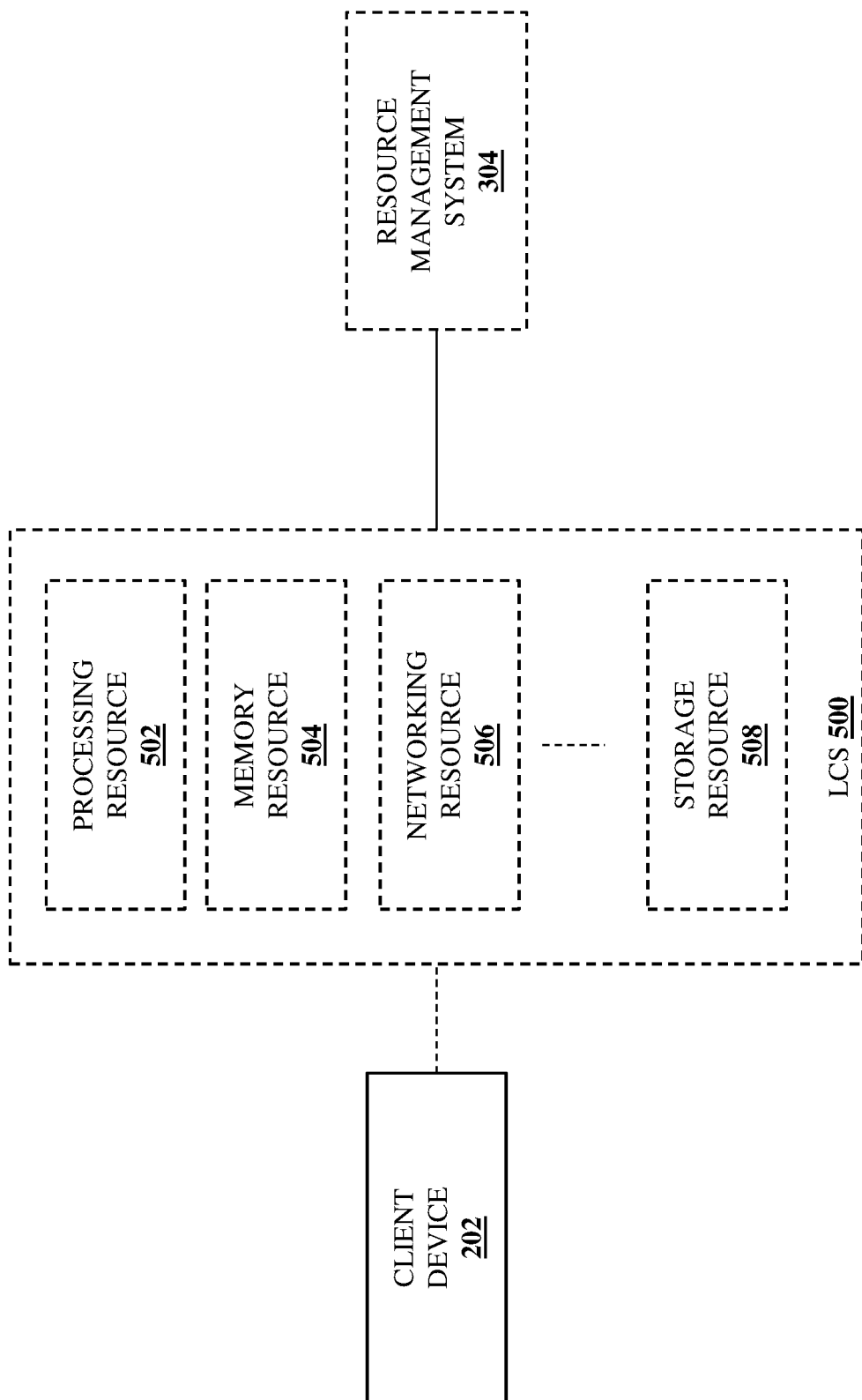
FIG. 5 is a schematic view illustrating an embodiment of the provisioning of an LCS using the LCS provisioning system of FIG. 2.

With reference to FIG. 5, an example of the provisioning of an LCS 500 to one of the client device(s) 202 is illustrated. For example, the LCS provisioning system 200 may allow a user of the client device 202 to express a "workload intent" that describes the general requirements of a workload that user would like to perform (e.g., "I need an LCS with 10 gigahertz (Ghz) of processing power and 8 gigabytes (GB) of memory capacity for an application requiring 20 terabytes (TB) of high-performance protected-object-storage for use with a hospital-compliant network", or "I need an LCS for a machine-learning environment requiring Tensorflow processing with 3 TB s of Accelerator PMEM memory capacity"). As will be appreciated by one of skill in the art in possession of the present disclosure, the workload intent discussed above may be provided to one of the LCS provisioning subsystems 206a-206c, and may be satisfied using resource systems that are included within that LCS provisioning subsystem, or satisfied using resource systems that are included across the different LCS provisioning subsystems 206a-206c.

As such, the resource management system 304 in the LCS provisioning subsystem that received the workload intent may operate to compose the LCS 500 using resource devices 404a-404c in the resource systems 306a-306c/400 in that LCS provisioning subsystem, and/or resource devices 404a-404c in the resource systems 306a-306c/400 in any of the other LCS provisioning subsystems. FIG. 5 illustrates the LCS 500 including a processing resource 502 allocated from one or more processing systems provided by one or more of the resource devices 404a-404c in one or more of the resource systems 306a-306c/400 in one or more of the LCS provisioning subsystems 206a-206c, a memory resource 504 allocated from one or more memory systems provided by one or more of the resource devices 404a-404c in one or more of the resource systems 306a-306c/400 in one or more of the LCS provisioning subsystems 206a-206c, a networking resource 506 allocated from one or more networking devices provided by one or more of the resource devices 404a-404c in one or more of the resource systems 306a-306c/400 in one or more of the LCS provisioning subsystems 206a-206c, and/or a storage resource 508 allocated from one or more storage devices provided by one or more of the resource devices 404a-404c in one or more of the resource systems 306a-306c/400 in one or more of the LCS provisioning subsystems 206a-206c.

Furthermore, as will be appreciated by one of skill in the art in possession of the present disclosure, any of the processing resource 502, memory resource 504, networking resource 506, and the storage resource 508 may be provided from a portion of a processing system (e.g., a core in a processor, a time-slice of processing cycles of a processor, etc.), a portion of a memory system (e.g., a subset of memory capacity in a memory device), a portion of a storage device (e.g., a subset of storage capacity in a storage device), and/or a portion of a networking device (e.g., a portion of the bandwidth of a networking device). Further still, as discussed above, the SCP device(s) 406 in the resource systems 306a-306c/400 that allocate any of the resource devices 404a-404c that provide the processing resource 502, memory resource 504, networking resource 506, and the storage resource 508 in the LCS 500 may also allocate their SCP hardware and/or perform enhanced functionality (e.g., the enhanced storage functionality in the specific examples provided above) for any of those resources that may otherwise not be available in the processing system, memory system, storage device, or networking device allocated to provide those resources in the LCS 500.

With the LCS 500 composed using the processing resources 502, the memory resources 504, the networking resources 506, and the storage resources 508, the resource management system 304 may provide the client device 202 resource communication information such as, for example, Internet Protocol (IP) addresses of each of the systems/devices that provide the resources that make up the LCS 500, in order to allow the client device 202 to communicate with those systems/devices in order to utilize the resources that make up the LCS 500. As will be appreciated by one of skill in the art in possession of the present disclosure, the resource communication information may include any information that allows the client device 202 to present the LCS 500 to a user in a manner that makes the LCS 500 appear the same as an integrated physical system having the same resources as the LCS 500.

Thus, continuing with the specific example above in which the user provided the workload intent defining an LCS with a 10 Ghz of processing power and 8 GB of memory capacity for an application with 20 TB of high-performance protected object storage for use with a hospital-compliant network, the processing resources 502 in the LCS 500 may be configured to utilize 10 Ghz of processing power from processing systems provided by resource device(s) in the resource system(s), the memory resources 504 in the LCS 500 may be configured to utilize 8 GB of memory capacity from memory systems provided by resource device(s) in the resource system(s), the storage resources 508 in the LCS 500 may be configured to utilize 20 TB of storage capacity from high-performance protected-object-storage storage device(s) provided by resource device(s) in the resource system(s), and the networking resources 506 in the LCS 500 may be configured to utilize hospital-compliant networking device(s) provided by resource device(s) in the resource system(s).

Similarly, continuing with the specific example above in which the user provided the workload intent defining an LCS for a machine-learning environment for Tensorflow processing with 3 TB s of Accelerator PMEM memory capacity, the processing resources 502 in the LCS 500 may be configured to utilize TPU processing systems provided by resource device(s) in the resource system(s), and the memory resources 504 in the LCS 500 may be configured to utilize 3 TB of accelerator PMEM memory capacity from processing systems/memory systems provided by resource device(s) in the resource system(s), while any networking/storage functionality may be provided for the networking resources 506 and storage resources 508, if needed.

Figure 6:
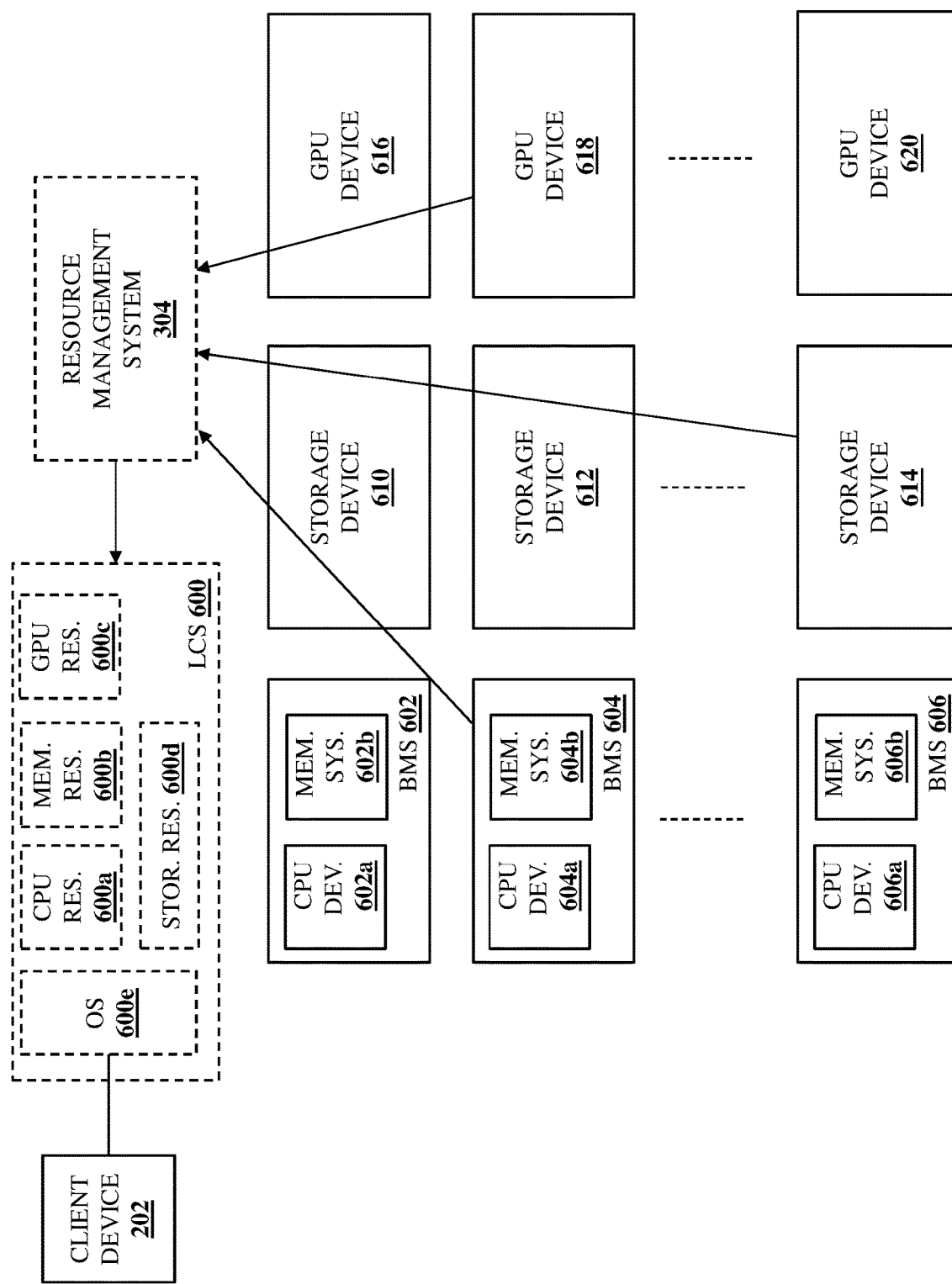
FIG. 6 is a schematic view illustrating an embodiment of the provisioning of an LCS using the LCS provisioning system of FIG. 2.

With reference to FIG. 6, another example of the provisioning of an LCS 600 to one of the client device(s) 202 is illustrated. As will be appreciated by one of skill in the art in possession of the present disclosure, many of the LCSs provided by the LCS provisioning system 200 will utilize a "compute" resource (e.g., provided by a processing resource such as an x86 processor, an AMD processor, an ARM processor, and/or other processing systems known in the art, along with a memory system that includes instructions that, when executed by the processing system, cause the processing system to perform any of a variety of compute operations known in the art), and in many situations those compute resources may be allocated from a Bare Metal Server (BMS) and presented to a client device 202 user along with storage resources, networking resources, other processing resources (e.g., GPU resources), and/or any other resources that would be apparent to one of skill in the art in possession of the present disclosure.

As such, in the illustrated embodiment, the resource systems 306a-306c available to the resource management system 304 include a Bare Metal Server (BMS) 602 having a Central Processing Unit (CPU) device 602a and a memory system 602b, a BMS 604 having a CPU device 604a and a memory system 604b, and up to a BMS 606 having a CPU device 606a and a memory system 606b. Furthermore, one or more of the resource systems 306a-306c includes resource devices 404a-404c provided by a storage device 610, a storage device 612, and up to a storage device 614. Further still, one or more of the resource systems 306a-306c includes resource devices 404a-404c provided by a Graphics Processing Unit (GPU) device 616, a GPU device 618, and up to a GPU device 620.

FIG. 6 illustrates how the resource management system 304 may compose the LCS 600 using the BMS 604 to provide the LCS 600 with CPU resources 600a that utilize the CPU device 604a in the BMS 604, and memory resources 600b that utilize the memory system 604b in the BMS 604. Furthermore, the resource management system 304 may compose the LCS 600 using the storage device 614 to provide the LCS 600 with storage resources 600d, and using the GPU device 318 to provide the LCS 600 with GPU resources 600c. As illustrated in the specific example in FIG. 6, the CPU device 604a and the memory system 604b in the BMS 604 may be configured to provide an operating system 600e that is presented to the client device 202 as being provided by the CPU resources 600a and the memory resources 600b in the LCS 600, with operating system 600e utilizing the GPU device 618 to provide the GPU resources 600c in the LCS 600, and utilizing the storage device 614 to provide the storage resources 600d in the LCS 600. The user of the client device 202 may then provide any application(s) on the operating system 600e provided by the CPU resources 600a/CPU device 604a and the memory resources 600b/memory system 604b in the LCS 600/BMS 604, with the application(s) operating using the CPU resources 600a/CPU device 604a, the memory resources 600b/memory system 604b, the GPU resources 600c/GPU device 618, and the storage resources 600d/storage device 614.

Furthermore, as discussed above, the SCP device(s) 406 in the resource systems 306a-306c/400 that allocates any of the CPU device 604a and memory system 604b in the BMS 604 that provide the CPU resource 600a and memory resource 600b, the GPU device 618 that provides the GPU resource 600c, and the storage device 614 that provides storage resource 600d, may also allocate SCP hardware and/or perform enhanced functionality (e.g., the enhanced storage functionality in the specific examples provided above) for any of those resources that may otherwise not be available in the CPU device 604a, memory system 604b, storage device 614, or GPU device 618 allocated to provide those resources in the LCS 500.

However, while simplified examples are described above, one of skill in the art in possession of the present disclosure will appreciate how multiple devices/systems (e.g., multiple CPUs, memory systems, storage devices, and/or GPU devices) may be utilized to provide an LCS. Furthermore, any of the resources utilized to provide an LCS (e.g., the CPU resources, memory resources, storage resources, and/or GPU resources discussed above) need not be restricted to the same device/system, and instead may be provided by different devices/systems over time (e.g., the GPU resources 600c may be provided by the GPU device 618 during a first time period, by the GPU device 616 during a second time period, and so on) while remaining within the scope of the present disclosure as well. Further still, while the discussions above imply the allocation of physical hardware to provide LCSs, one of skill in the art in possession of the present disclosure will recognize that the LCSs described herein may be composed similarly as discussed herein from virtual resources. For example, the resource management system 304 may be configured to allocate a portion of a logical volume provided in a Redundant Array of Independent Disk (RAID) system to an LCS, allocate a portion/time-slice of GPU processing performed by a GPU device to an LCS, and/or perform any other virtual resource allocation that would be apparent to one of skill in the art in possession of the present disclosure in order to compose an LCS.

Similarly as discussed above, with the LCS 600 composed using the CPU resources 600a, the memory resources 600b, the GPU resources 600c, and the storage resources 600d, the resource management system 304 may provide the client device 202 resource communication information such as, for example, Internet Protocol (IP) addresses of each of the systems/devices that provide the resources that make up the LCS 600, in order to allow the client device 202 to communicate with those systems/devices in order to utilize the resources that make up the LCS 600. As will be appreciated by one of skill in the art in possession of the present disclosure, the resource communication information allows the client device 202 to present the LCS 600 to a user in a manner that makes the LCS 600 appear the same as an integrated physical system having the same resources as the LCS 600.

As will be appreciated by one of skill in the art in possession of the present disclosure, the LCS provisioning system 200 discussed above solves issues present in conventional Information Technology (IT) infrastructure systems that utilize "purpose-built" devices (server devices, storage devices, etc.) in the performance of workloads and that often result in resources in those devices being underutilized. This is accomplished, at least in part, by having the resource management system(s) 304 "build" LCSs that satisfy the needs of workloads when they are deployed. As such, a user of a workload need simply define the needs of that workload via a "manifest" expressing the workload intent of the workload, and resource management system 304 may then compose an LCS by allocating resources that define that LCS and that satisfy the requirements expressed in its workload intent, and present that LCS to the user such that the user interacts with those resources in same manner as they would physical system at their location having those same resources.

Figure 7:
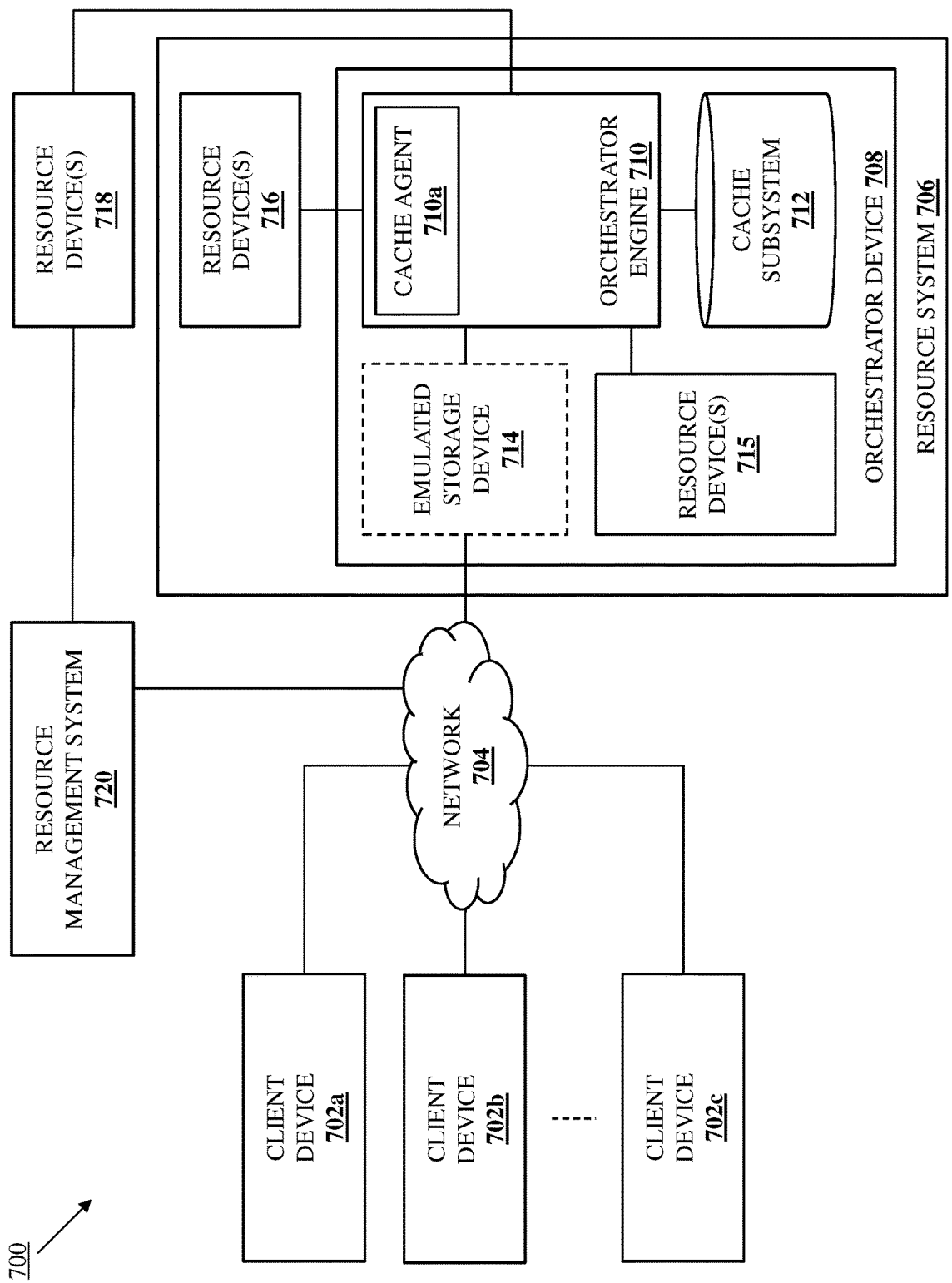
FIG. 7 is a schematic view illustrating an embodiment of an LCS data provisioning system provided according to the teachings of the present disclosure.

Referring now to FIG. 7, an embodiment of an LCS data provisioning system 700 is illustrated that may be provided according to the teachings of the present disclosure. In the illustrated embodiment, the LCS data provisioning system 700 includes a plurality of client devices 702a, 702b, and up to 702c, any of which may be provided by the client device(s) 202 discussed above. As such, any or all of the client devices 702a-702c may be provided by the IHS 100 discussed above with reference to FIG. 1, and/or may include some or all of the components of the IHS 100, and in specific examples may be provided by desktop computing devices, laptop/notebook computing devices, tablet computing device, and/or mobile phones. However, while illustrated and discussed as being provided by particular computing devices, one of skill in the art in possession of the present disclosure will recognize that client devices provided in the LCS data provisioning system 700 may include any devices that may be configured to operate similarly as discussed below. In the illustrated embodiment, each of the client devices 702a-702c is coupled to a network 704 that may be provided by a Local Area Network (LAN), the Internet, combinations thereof, and/or other networks that would be apparent to one of skill in the art in possession of the present disclosure.

In the illustrated embodiment, a resource system 706 is coupled to the network 704, and may be provided by any of the resource systems 306a, 306b, 306c, and 400, and/or the BMS systems 602, 604, and 606 discussed above. As such, the resource system 706 includes an orchestrator device 708 that may be provided by the SCP devices, DPU devices, and/or other orchestrator devices discussed above. Furthermore, the orchestrator device 708 may include a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an orchestrator engine 710 that is configured to perform the functionality of the orchestrator engines and/or orchestrator devices discussed above. In the embodiments illustrated and described herein, the orchestrator engine 710 includes a cache agent 710a that performs some of the functionality of the orchestrator engine 710, but one of skill in the art in possession of the present disclosure will recognize how the functionality described below as being performed by the orchestrator engine 710 may be enabled in a variety of manners that will fall within the scope of the present disclosure as well.

As illustrated, the orchestrator device 708 may also include a storage system (not illustrated, but which may include the storage 108 discussed above with reference to FIG. 1) that is coupled to the orchestrator engine 710 (e.g., via a coupling between the storage system and the processing system) and that includes a cache subsystem 712 that is configured to store any of the data provided by the orchestrator engine 712 during the caching operations discussed below. However, while the cache subsystem 712 is illustrated and described as being included on the orchestrator device 708 in order to, for example, optimize the read latency reductions discussed below, one of skill in the art in possession of the present disclosure will appreciate how the cache subsystem 712 may be moved outside of orchestrator device 708 and to any locations along the Input/Output (I/O) path between the client devices and the storage subsystem(s) discussed below while remaining within the scope of the present disclosure as well.

In the examples discussed below, the orchestrator engine 710 is configured to present an emulated storage device 714 such as, for example, a Non-Volatile Memory express (NVMe) storage device, through the network to any of the client devices 702a-702c. However, one of skill in the art in possession of the present disclosure will appreciate how the orchestrator engine 710 may be configured to emulate other types of devices to the client devices 702a-702c while remaining within the scope of the present disclosure as well. Furthermore, while the orchestrator device 708 is illustrated and described below as providing the emulated storage device 714, one of skill in the art in possession of the present disclosure will appreciate how the emulated storage device 714 may be provided by systems outside of the orchestrator device 708 (e.g., by a virtual machine running on hardware in the resource system 706) while remaining within the scope of the present disclosure as well. The orchestrator device 708 may also include resource device(s) 715 that are coupled to the orchestrator engine 710 (e.g., via a coupling between the resource device(s) 715 and the processing system) and that are discussed below as including compression/decompression hardware and/or the encryption/decryption hardware, but that may include other storage service hardware known in the art, as well as other hardware for performing other resource functionality that would be apparent to one of skill in the art in possession of the present disclosure.

In the illustrated embodiment and as discussed above, the resource system 706 may also include one or more resource devices 716 that are coupled to the orchestrator engine 710 (e.g., via a coupling between the resource device(s) 716 and the processing system) and that are discussed below as including storage devices, but which one of skill in the art in possession of the present disclosure will appreciate may include other resource devices while remaining within the scope of the present disclosure. Furthermore, in the illustrated embodiment and as also discussed above, the LCS data provisioning system 700 may also include one or more resource devices 718 that are located outside the resource system 706 (e.g., in another resource system similarly as discussed above) and coupled to the orchestrator engine 710 (e.g., via a coupling between the resource device(s) 718 and the processing system), and while the resource devices 718 are discussed below as including storage devices, one of skill in the art in possession of the present disclosure will appreciate that the resource devices 718 may include other types of resource devices while remaining within the scope of the present disclosure.

Furthermore, in the illustrated embodiment and as also discussed above, the LCS data provisioning system 700 may also include a resource management system 720 that may be provided by the resource management system 304 discussed above, and that is coupled to each of the network 704 and the resource device(s) 718 (and that may be coupled to the resource system 706, not illustrated in FIG. 7). As discussed above, the resource management system 720 and the orchestrator device 708 may cooperate to provide LCSs to the client devices 702a-702c using the resource devices 715, 716, and/or 718, and as discussed below the LCS data provisioning system 700 is configured to reduce latency in the provisioning of data to the client devices 702a-702c in some scenarios. However, while a specific LCS data provisioning system 700 has been illustrated and described, one of skill in the art in possession of the present disclosure will recognize that the LCS data provisioning system of the present disclosure may include a variety of components and/or component configurations for providing conventional LCS provisioning functionality, as well as the functionality discussed below, while remaining within the scope of the present disclosure as well.

Figure 8A:
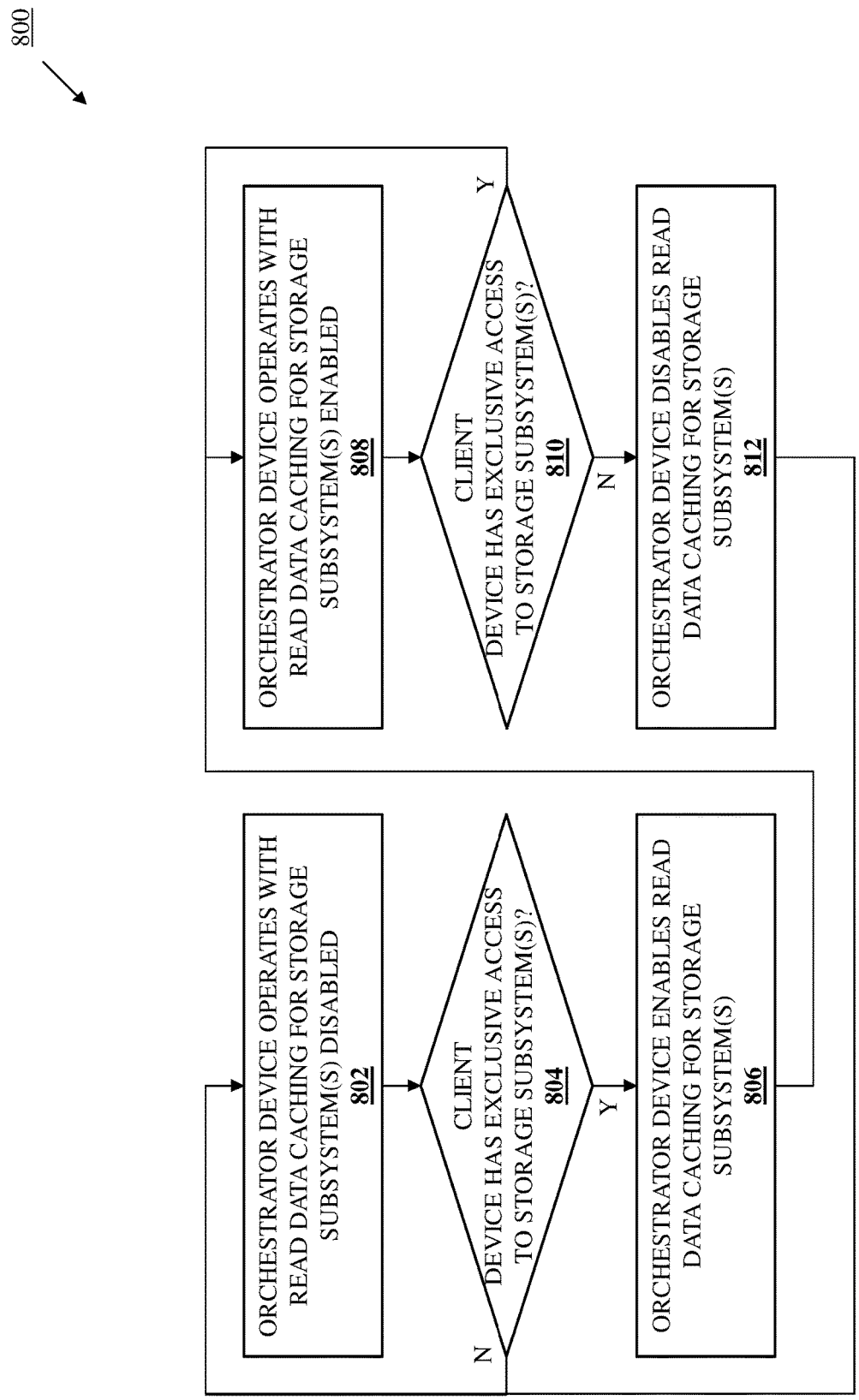
FIG. 8A is a flow chart illustrating an embodiment of a method for providing data via an LCS.

Referring now to FIG. 8A, an embodiment of a method 800 for providing data via an LCS is illustrated. As discussed below, the systems and methods of the present disclosure enable read caching for storage subsystem(s) in a Logically Composed System (LCS) provisioning system that are exclusively accessed by a client device in order to reduce data read latency for data stored in those storage subsystem(s), while disabling read caching for the storage subsystem(s) when they are accessible by multiple client devices in order to prevent cache issues that are introduced when multiple different client devices have access to the same storage subsystem(s). For example, the LCS data provisioning system of the present disclosure may include an orchestrator device that includes a cache subsystem and that is coupled to client devices and storage subsystem(s). When the orchestrator device identifies that a first client device has exclusive access to the storage subsystem(s), it activates read data caching for the storage subsystem(s). The orchestrator device then receives a first read request from the first client device that is directed to first data that is stored in the storage subsystem(s) and, in response, retrieves the first data from the cache subsystem and provides the first data to the first client device. When the orchestrator device identifies that the first client device no longer has exclusive access to the storage subsystem(s), it deactivates the read data caching for the storage subsystem(s). As such, read latency is reduced in client device/storage subsystem exclusive access scenarios without requiring relatively complicated data coordination algorithms and otherwise incurring relatively high amounts of storage operation overhead that occurs in multi-client-device/storage subsystem shared access scenarios.

The method 800 begins at block 802 where an orchestrator device operates with read data caching for one or more storage subsystems disabled. With reference back to FIG. 7, in the specific examples discussed below, the storage subsystem(s) that are the subject of enabled/disabled read caching of the present disclosure are included in storage device(s) provided by the resource device(s) 718 that are outside of the resource system 706. However, one of skill in the art in possession of the present disclosure will appreciate how the storage subsystem(s) that are the subject of enabled/disabled read caching of the present disclosure may be included in storage device(s) provided by the resource device(s) 716 in the resource system 706 and/or (in some embodiments) the resource device(s) 715 included on the orchestrator device 708 while remaining within the scope of the present disclosure as well.

Furthermore, in the specific examples discussed below, the method 800 begins at block 802 where the LCS data provisioning system 700 is operating with the storage subsystem(s) in the storage device(s) provided by the resource device(s) 718 shared by two or more of the client devices 702a-702c. However, one of skill in the art in possession of the present disclosure will appreciate how the method 800 may begin with one of the client devices 702a-702c having exclusive access to the storage subsystem(s) in the storage device(s) provided by the resource device(s) 718 as discussed below while remaining within the scope of the present disclosure as well. As such, in an embodiment of block 802, each of the client devices 702a-702c may have access to one or more storage subsystem(s) in the storage device(s) provided by the resource device(s) 718 (which as discussed above may be included in another resource system 706). In the examples below, the storage subsystem(s) in the storage device(s) provided by the resource device(s) 718 are described as being provided by a storage volume in a Non-Volatile Memory express (NVMe) storage device provided by one of the resource devices 718 in a resource system, but one of skill in the art in possession of the present disclosure will recognized that the storage subsystem(s) of the present disclosure may be defined and/or provided in a variety of manners that will fall within the scope of the present disclosure.

Figure 9A:
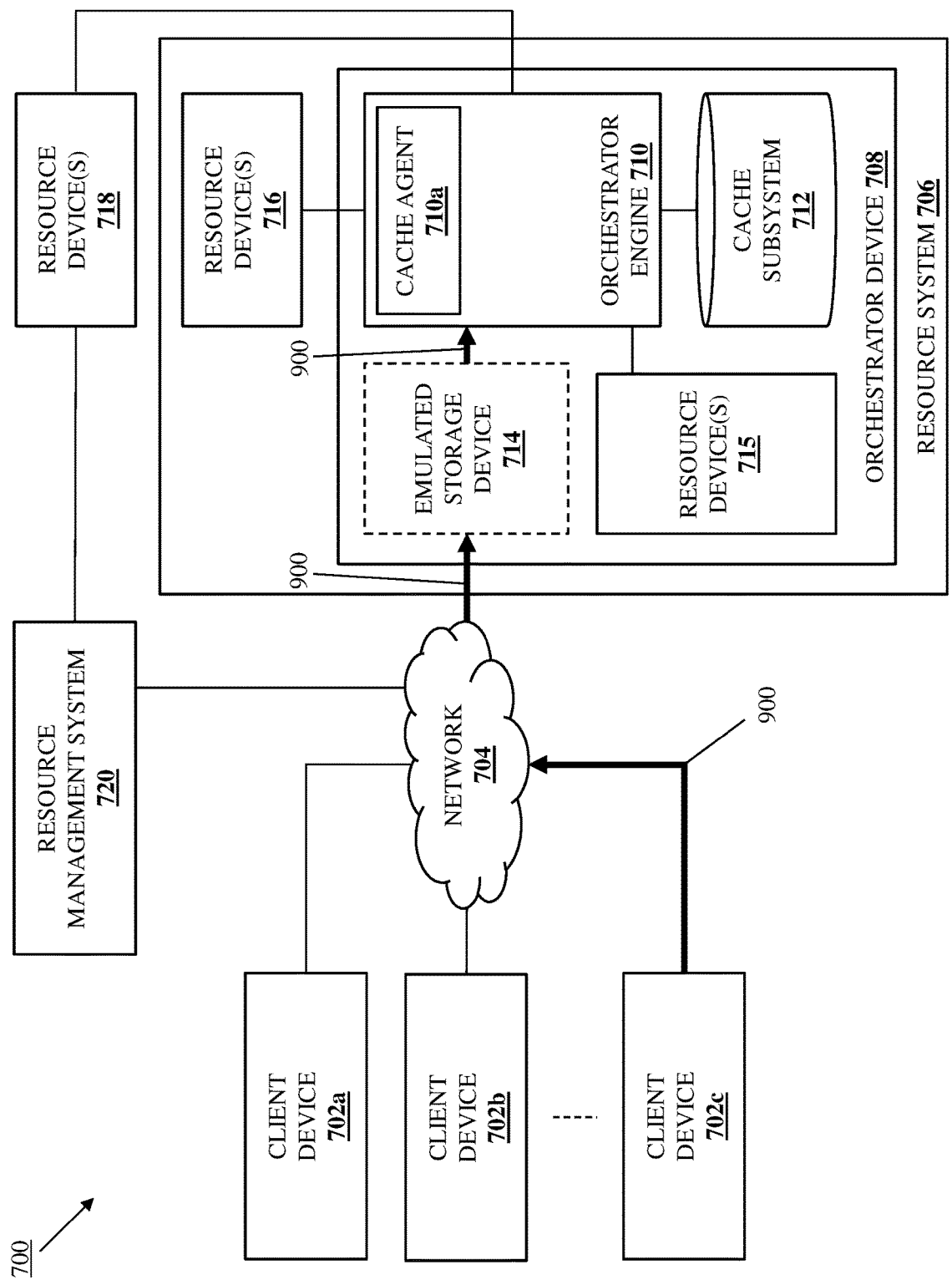
FIG. 9A is a schematic view illustrating an embodiment of the LCS data provisioning system of FIG. 7 operating during the method of FIG. 8.

As such, in an embodiment of block 802, each of the client devices 702a-702c may be provided an LCS by the resource management system 720 and the orchestrator device 708 similarly as described above, with the orchestrator device 708 allowing each of the client devices 702a-702c access to the storage volume in the storage device provided by the resource device 718. As described in further detail below, the orchestrator device 708 will operate to disable caching for the storage volume in the storage device provided by the resource device 718 in the event more than one of the client devices 702a-702c has access to that storage volume, and thus read operations may be performed by any of the client devices 702a-702c during block 802 on that storage volume that is shared between the client devices 702a-702c. For example, with reference to FIG. 9A and in an embodiment of block 802, the client device 702c may perform data read request operations 900 that may include providing a read request for data stored in the storage volume through the network 704 to the emulated storage device 714 (e.g., by providing that read request in a submission queue in the client device 702c and ringing a doorbell of the emulated storage device 714 to cause the emulated storage device 714 to retrieve that read request from the submission queue in the client device 702c and provide that read request to the orchestrator engine 710).

Figure 9B:
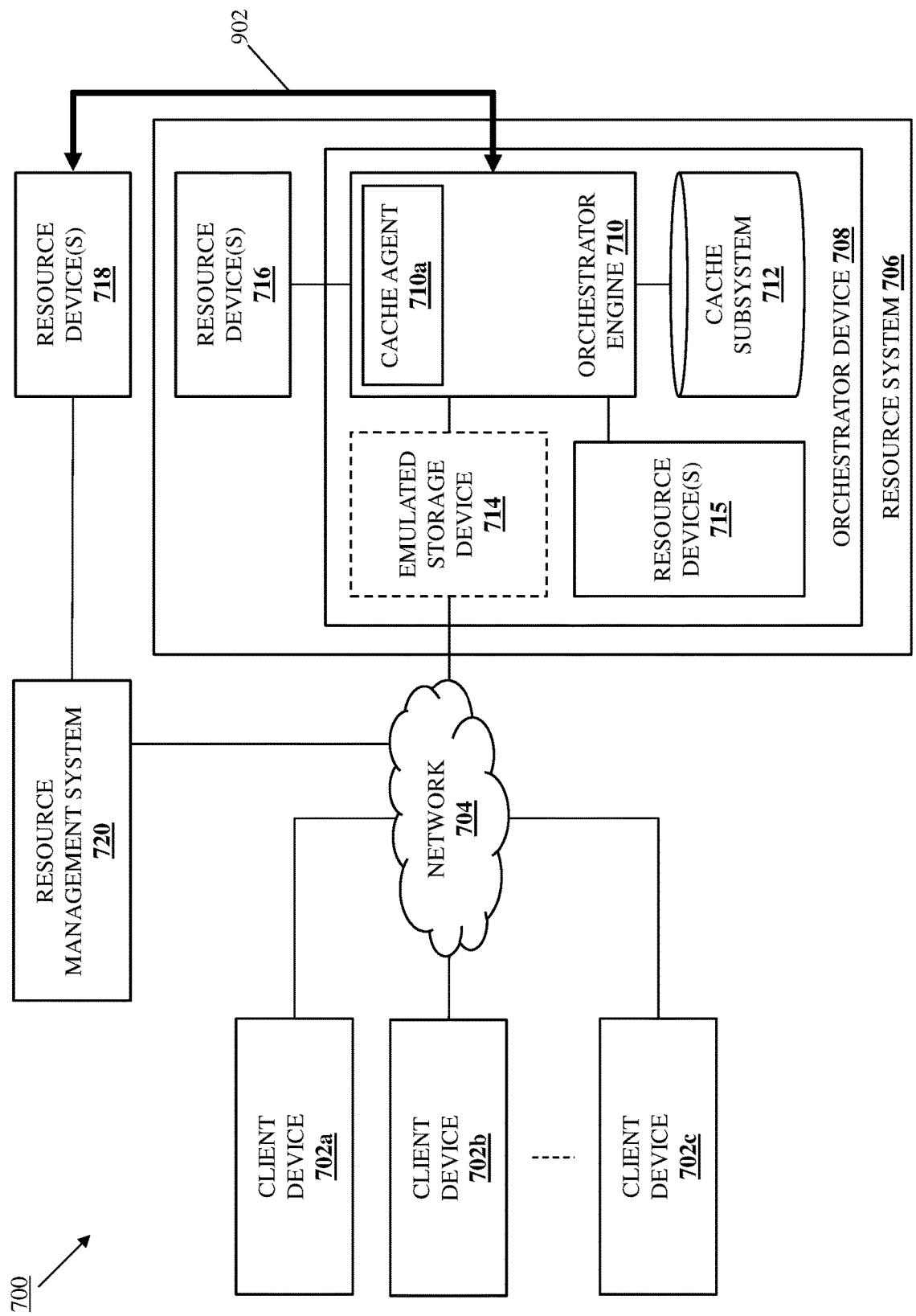
FIG. 9B is a schematic view illustrating an embodiment of the LCS data provisioning system of FIG. 7 operating during the method of FIG. 8.

With reference to FIG. 9B, at block 802 and in response to receiving the read request, the orchestrator device 710 may then perform data retrieval operations 902 that may include providing a read instruction for the data to the storage volume in the storage device provided by the resource device 718 (e.g., by transmitting a read instruction to the resource system (e.g., a server device) that includes the storage device providing the storage volume). In response to receiving the read instruction, the data stored in the storage volume may be retrieved (e.g., by the resource system (e.g., a server device) that includes the storage device providing the storage volume) and provided to the orchestrator device 708. In some examples, storage services such as decompression, decryption, and/or other storage services that would be apparent to one of skill in the art in possession of the present disclosure may be performed on the data retrieved from the storage volume prior to transmitting that data to the orchestrator device 708 (e.g., by the storage device providing that storage volume, by the resource system that includes that storage volume, by an orchestrator device in the resource system that includes that storage volume, etc.).

Figure 9C:
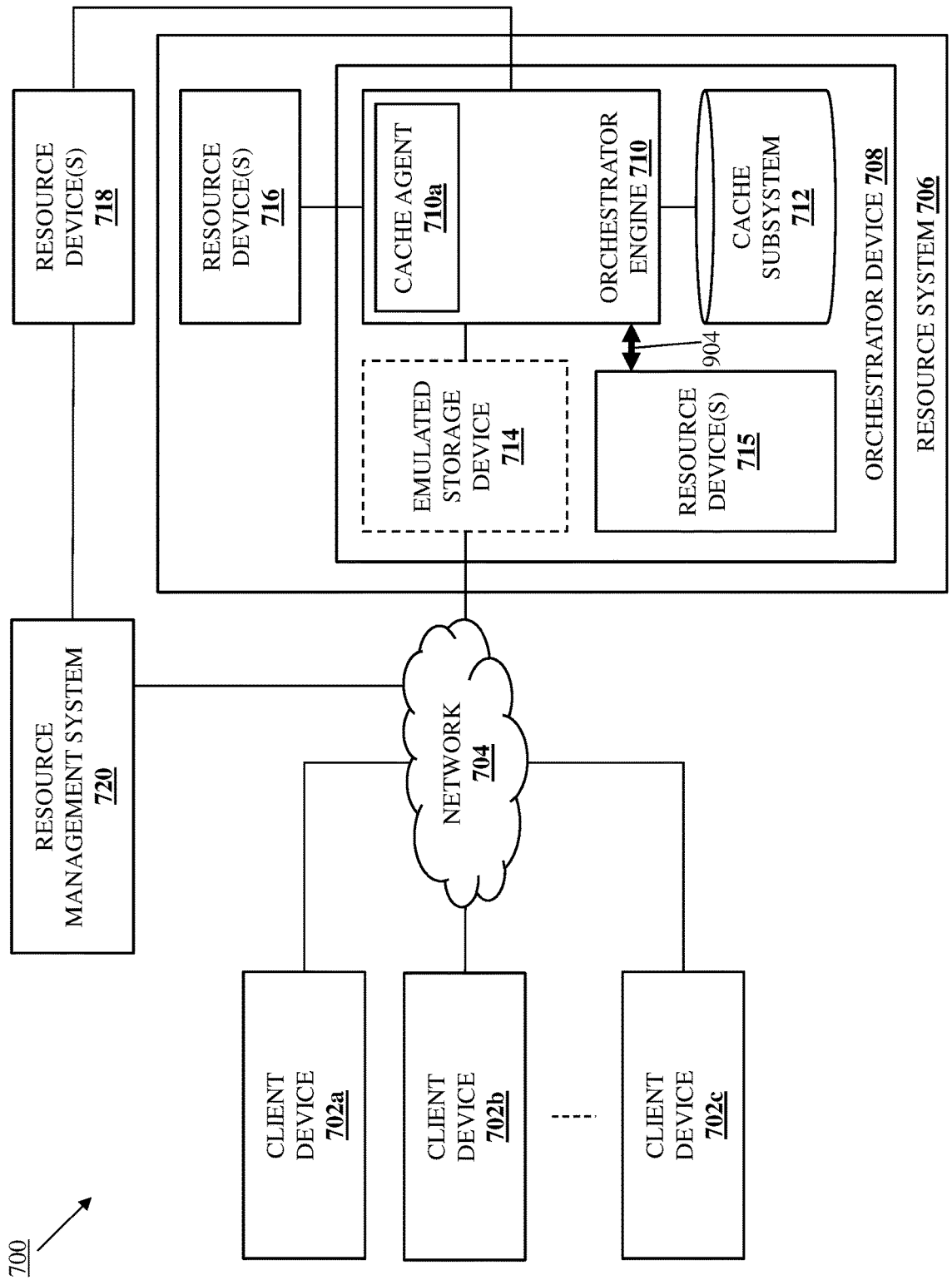
FIG. 9C is a schematic view illustrating an embodiment of the LCS data provisioning system of FIG. 7 operating during the method of FIG. 8.

In other examples, the data retrieved from the storage volume may be transmitted to the orchestrator device 708 without performing storage services such as decompression, decryption, and/or other storage services that would be apparent to one of skill in the art in possession of the present disclosure. With reference to FIG. 9C, in such examples in which the data retrieved from the storage volume is transmitted to the orchestrator device 708 without performing storage services (e.g., that data is transmitted compressed, encrypted, and/or in any other state that requires the storage services described herein), the orchestrator engine 710 in the orchestrator device 708 may perform storage service operations 904 that may include providing that data to the resource device(s) 715 (which as discussed above may include decompression hardware, decryption hardware, and/or other storage service hardware that would be apparent to one of skill in the art in possession of the present disclosure) such that the resource device(s) 715 perform the storage services such as decompression, decryption, and/or other storage services on that data before providing that data back to the orchestrator engine 710.

Figure 9D:
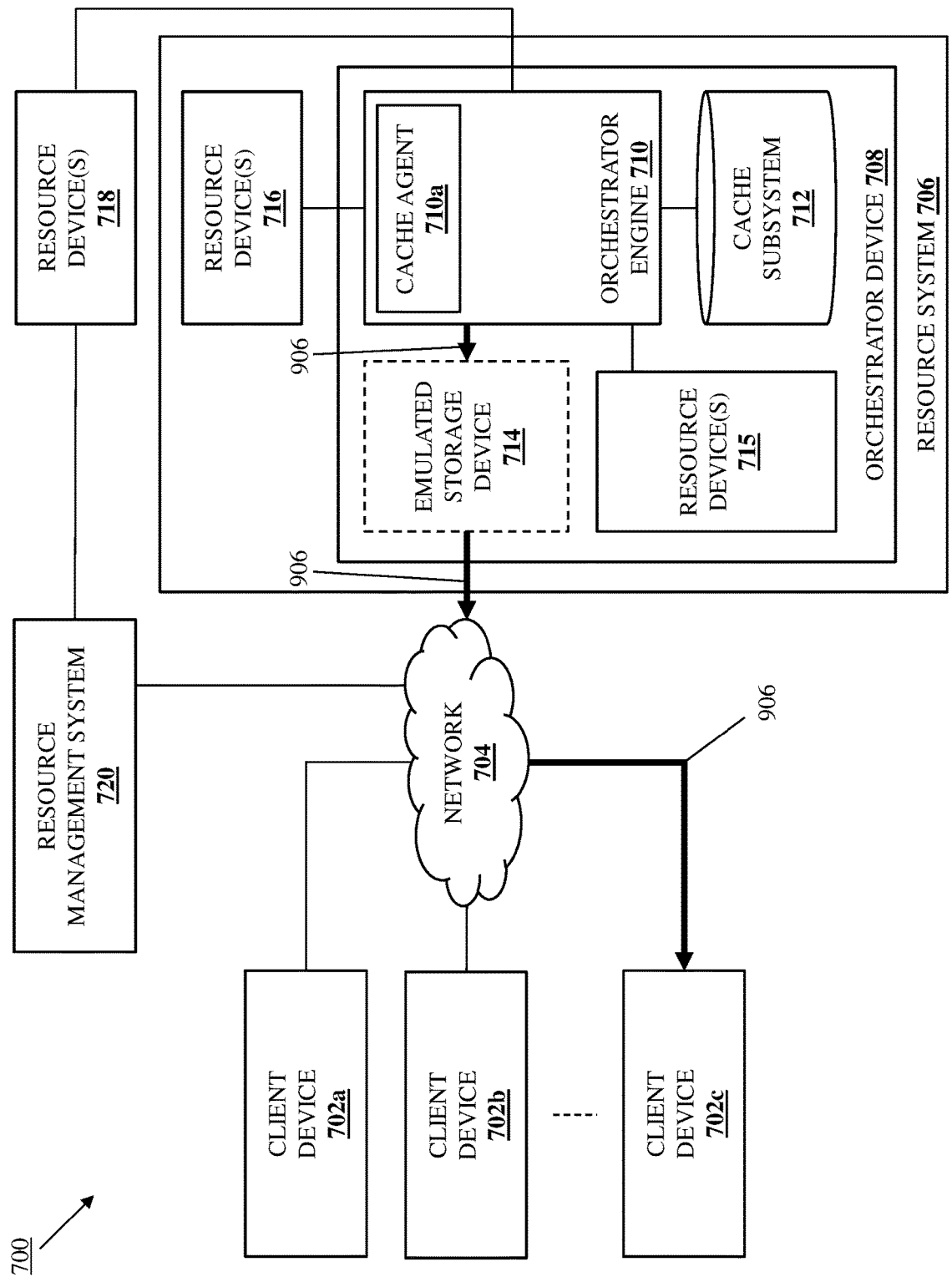
FIG. 9D is a schematic view illustrating an embodiment of the LCS data provisioning system of FIG. 7 operating during the method of FIG. 8.

With reference to FIG. 9D, at block 802 the orchestrator engine 710 may then perform data provisioning operations 906 that may include providing the data (i.e., decompressed and/or unencrypted data) via the emulated storage device 714 and through the network 704 to the client device 702c. As such, any of the client devices 702a-702c may read data stored in the shared storage volume in the storage device provided by the resource device 718 at block 802, and one of skill in the art in possession of the present disclosure will appreciate how the storage service operations performed on that data before that data is provided to a client device may introduce the read latency discussed above. Furthermore, while a specific example of the operation of the LCS data provisioning system 700 with read data caching disabled for a storage volume shared by the client devices 702a-702c has been described, one of skill in the art in possession of the present disclosure will appreciate how the LCS data provisioning system 700 may operate in other manners with read data caching disabled while remaining within the scope of the present disclosure as well.

The method 800 then proceeds to decision block 804 where the orchestrator device determines whether a client device has exclusive access to the storage subsystem(s). In an embodiment, at decision block 804, the orchestrator engine 710 in the orchestrator device 708 may monitor the storage volume in the storage device provided by the resource device 718 to determine whether any one of the client devices 702a-702c has exclusive access to that storage volume. As discussed in further detail below, storage volume allocation/mapping requests may be generated by the resource management system 720 for the storage volume in the storage device provided by the resource device 718 in order to provide access to that storage volume to any of the client devices 702a-702c, and storage volume deallocation/unmapping requests may be generated by the resource management system 720 for the storage volume in the storage device provided by the resource device 718 in order to relinquish access to that storage volume for any of the client devices 702a-702c.

In some examples and in response to the storage volume deallocation/unmapping requests discussed above, the orchestrator device 708 may be notified (e.g., by the resource system that includes the storage volume and that receives the storage volume storage volume deallocation/unmapping requests) when access to the storage volume is exclusive to a single client device, and thus the monitoring at decision block 804 may include monitoring for such notifications. However, one of skill in the art in possession of the present disclosure will appreciate how the orchestrator device 708 may determine whether a client device has exclusive access to a storage subsystem in a variety of manners that will fall within the scope of the present disclosure as well.

If, at decision block 804, it is determined that the client device does not has exclusive access to the storage subsystem(s), the method 800 returns to block 802. As such, as long as access to the storage volume in the storage device provided by the resource device(s) 718 is shared between at least two of the client devices 702a-702c, the method 800 may loop such that orchestrator device 708 operates with read data caching for that storage volume disabled, and monitors to determine whether one of the client devices has exclusive access to that storage volume.

Figure 10A:
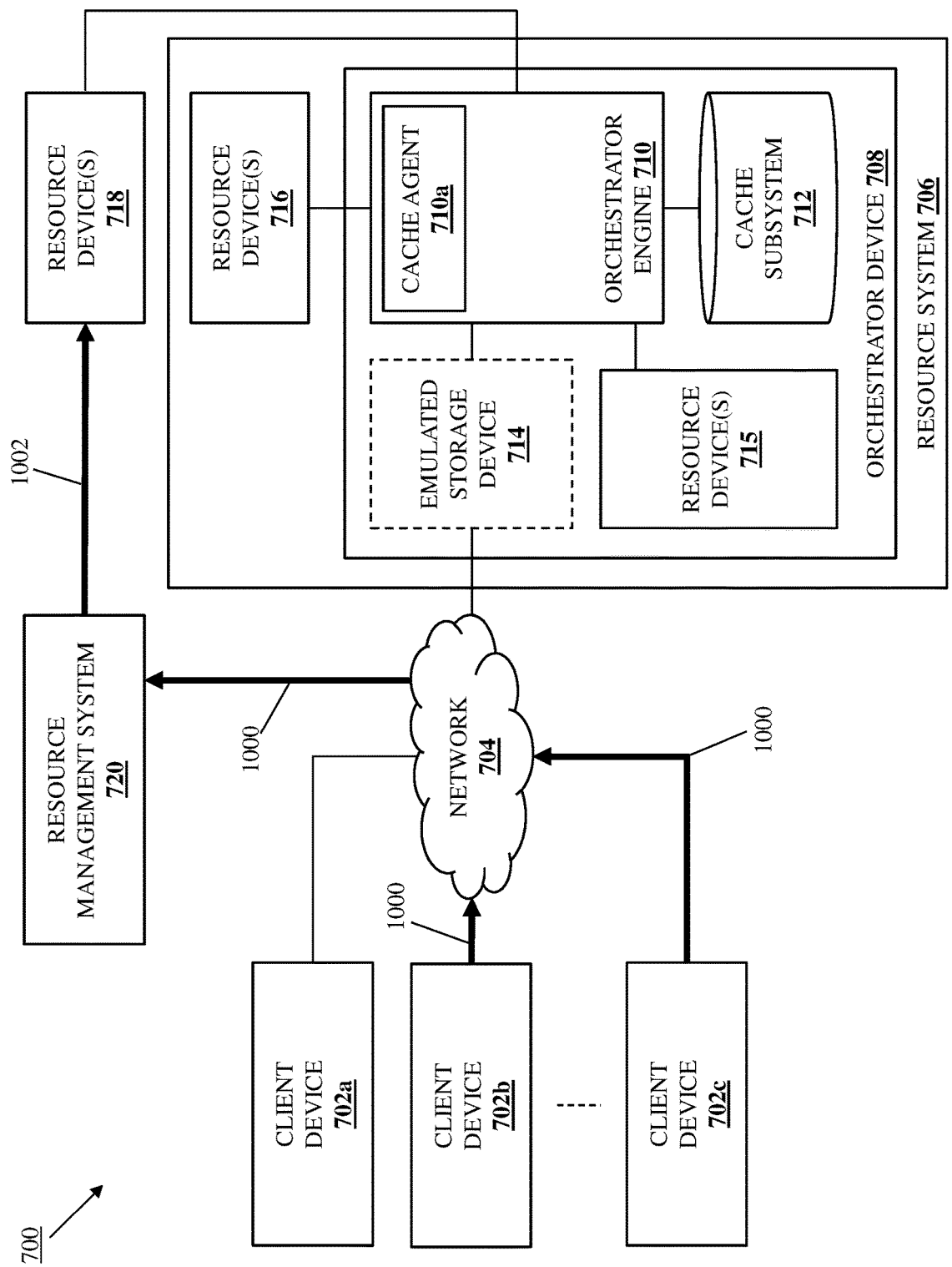
FIG. 10A is a schematic view illustrating an embodiment of the LCS data provisioning system of FIG. 7 operating during the method of FIG. 8.

If, at decision block 804, it is determined that the client device has exclusive access to the storage subsystem(s), the method 800 proceeds to block 806 where the orchestrator device enables read data caching for the storage subsystem(s). With reference to FIG. 10A, in an embodiment of decision block 804, each of the client devices 702b and 702c may have performed storage volume deallocation/unmapping operations 1000 that includes performing operation(s) that indicate via the network 704 to the resource management system 720 that the storage volume in the storage device provided by the resource device 718 is no longer needed by that client device, not currently needed by that client device, and/or otherwise may be deallocated/unmapped from that client device.

As will be appreciated by one of skill in the art in possession of the present disclosure, storage volumes provided by storage devices in an LCS provisioning system will typically be accessed exclusively by a particular client device, but there will be situations in which access to a storage volume is shared. For example, when an LCS is migrated between BMS systems, shared access to a storage volume provided by a storage device may be configured so that the orchestrator device on the resource systems (e.g., the SCP devices on both the BMS system from which an LCS is being migrated from and a BMS system to which an LCS is being migrated to) may access that storage volume during the LCS migration. However, one of skill in the art in possession of the present disclosure will appreciate how, following the LCS migration (e.g., the storage volume deallocation/unmapping operations 1000 in this example), that storage volume may then be unmapped from the orchestrator device/resource system from which the LCS was migrated. Similar situations may exist in data backup or data warehouse scenarios in which a data backup engine or data analysis engine may be granted shared access to a storage volume with an LCS, and unmapped after data backup or data analysis is completed.

In response to the deallocation/unmapping operations 1000, the resource management system 720 may then perform storage volume deallocation/unmapping instruction operations 1002 that may include transmitting storage volume deallocation/unmapping instructions that cause each of the client devices 702b and 702c to be deallocated/unmapped from the storage volume in the storage device provided by the resource device 718. For example, the resource management system 720 may transmit the storage volume deallocation/unmapping instructions to a resource system (e.g., a server device) that includes the storage device providing the storage volume, and the resource system (e.g., an orchestrator device in that resource system) may operate to deallocate/unmap each of the client devices 702b and 702c from that storage volume.

Figure 10B:
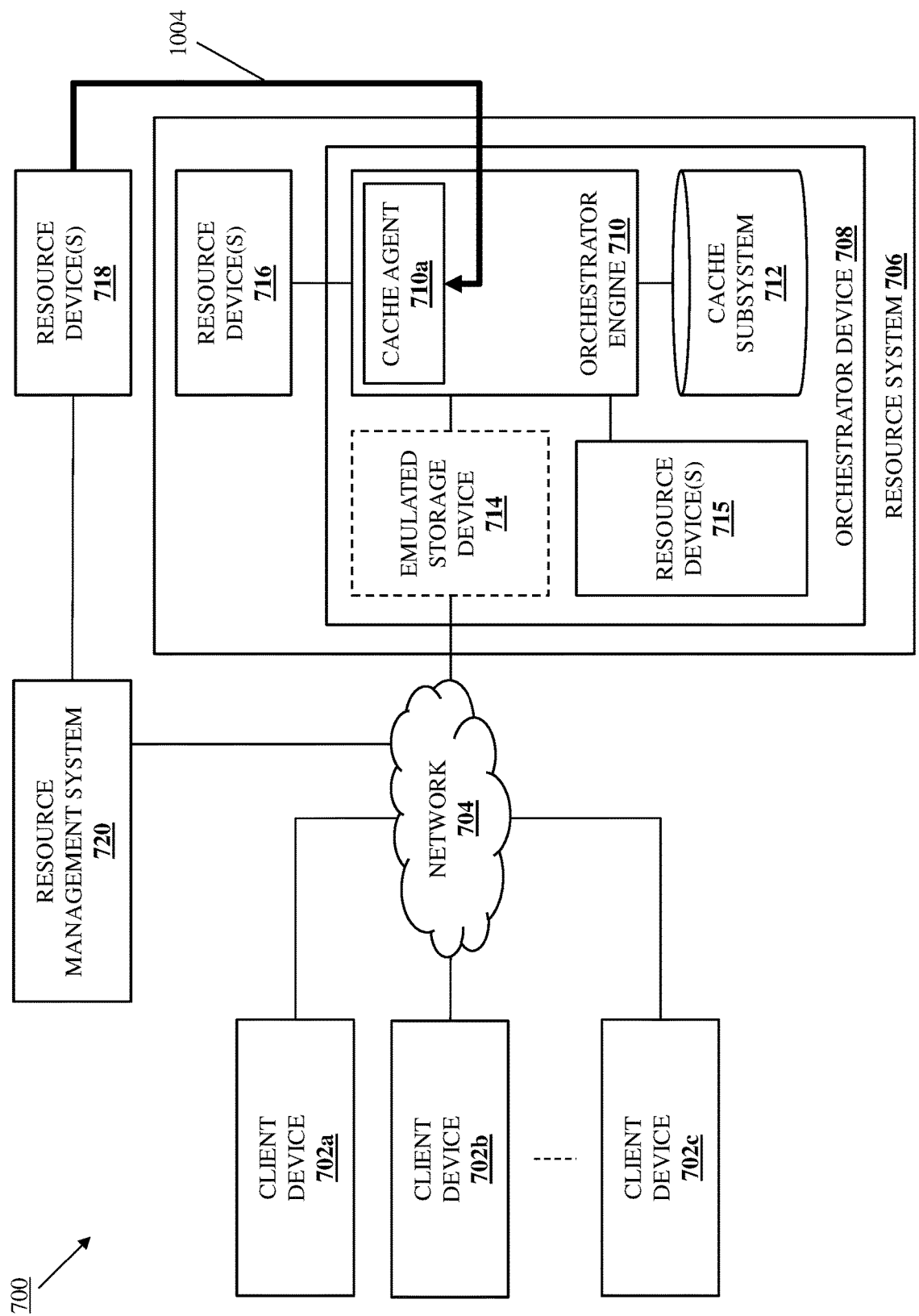
FIG. 10B is a schematic view illustrating an embodiment of the LCS data provisioning system of FIG. 7 operating during the method of FIG. 8.

With reference to FIG. 10B, in an embodiment of decision block 804 and in response to each of the client devices 702b and 702c having been deallocated/unmapped from the storage volume in the storage device provided by the resource device 718, exclusive access identification operations 1004 may be performed to notify the cache agent 710a in the orchestrator engine 710 of the orchestrator device 708 that the client device 702a has exclusive access to that storage volume. For example, in response to each of the client devices 702b and 702c having been deallocated/unmapped from the storage volume as discussed above, the resource system (e.g., a server device) that includes the storage device providing the storage volume may perform the exclusive access identification operations 1004 that include transmitting a storage volume exclusive access notification to the cache agent 710a that notifies the cache agent 710a that the client device 702a has exclusive access to the storage volume. However, while a specific example of the notification of the orchestrator device 708 that a client device has exclusive access to the storage volume has been provided, one of skill in the art in possession of the present disclosure will appreciate that the orchestrator device 708 may identify exclusive access by a client device to a storage volume in a variety of manners that will fall within the scope of the present disclosure as well.

As such, in an embodiment of block 806 and in response to identifying that the client device 702a has exclusive access to the storage volume in the storage device provided by the resource device 718, the cache agent 710a in the orchestrator engine 710 of the orchestrator device 708 may enable read data caching for that storage volume. For example, at block 806, the cache agent 710a may enable the read data caching discussed below by setting a register in an orchestrator device processing system, setting a flag in an orchestrator device memory system, and/or performing any of a variety of other operations that one of skill in the art in possession of the present disclosure would recognize as allowing the read data caching operations discussed below for the storage volume to be performed.

Following block 806, the method 800 then proceeds to block 808 where the orchestrator device operates with read data caching for the storage subsystem(s) enabled. As discussed in further detail below, in an embodiment of block 808 and in response to enabling the read data caching for the storage volume as discussed above, the orchestrator device 708 may operate with read data caching enabled for the storage volume in the storage device provided by the resource device 718, which as discussed below may include the orchestrator device 708 identifying read data for caching, retrieving that read data from the storage volume and storing that read data in the cache subsystem 712 following the performing of storage services such as the decompression and/or decryption described herein, and providing that read data to the client device 702a in response to read requests that identify that data.

The method 800 then proceeds to decision block 810 where the orchestrator device determines whether the client device has exclusive access to the storage subsystem(s). Similarly as discussed above with reference to decision block 804, at decision block 810 the orchestrator engine 710 in the orchestrator device 708 may monitor the storage volume in the storage device provided by the resource device 718 to determine whether two or more of the client devices have access to that storage volume. As discussed above, storage volume allocation/mapping requests may be generated by the resource management system 720 for the storage volume in the storage device provided by the resource device(s) 718 in order to provide access to that storage volume to any of the client devices 702a-702c, and the orchestrator device 708 may be notified (e.g., by the resource system that includes the storage volume and that receives the storage volume allocation/mapping requests) when the storage volume is shared by two or more client devices, and thus the monitoring at decision block 810 may include monitoring for such notifications. However, one of skill in the art in possession of the present disclosure will appreciate how the orchestrator device 708 may determine whether two or more client devices have access to a storage subsystem in a variety of manners that will fall within the scope of the present disclosure as well.

If, at decision block 810, it is determined that the client device has exclusive access to the storage subsystem(s), the method 800 returns to block 808. As such, as long as access to the storage volume in the storage device provided by the resource device 718 is exclusive to the client device 702a, the method 800 may loop such that orchestrator device 708 operates with read data caching for that storage volume enabled, and monitors to determine whether two or more of the client devices has access to that storage volume.

Figure 8B:
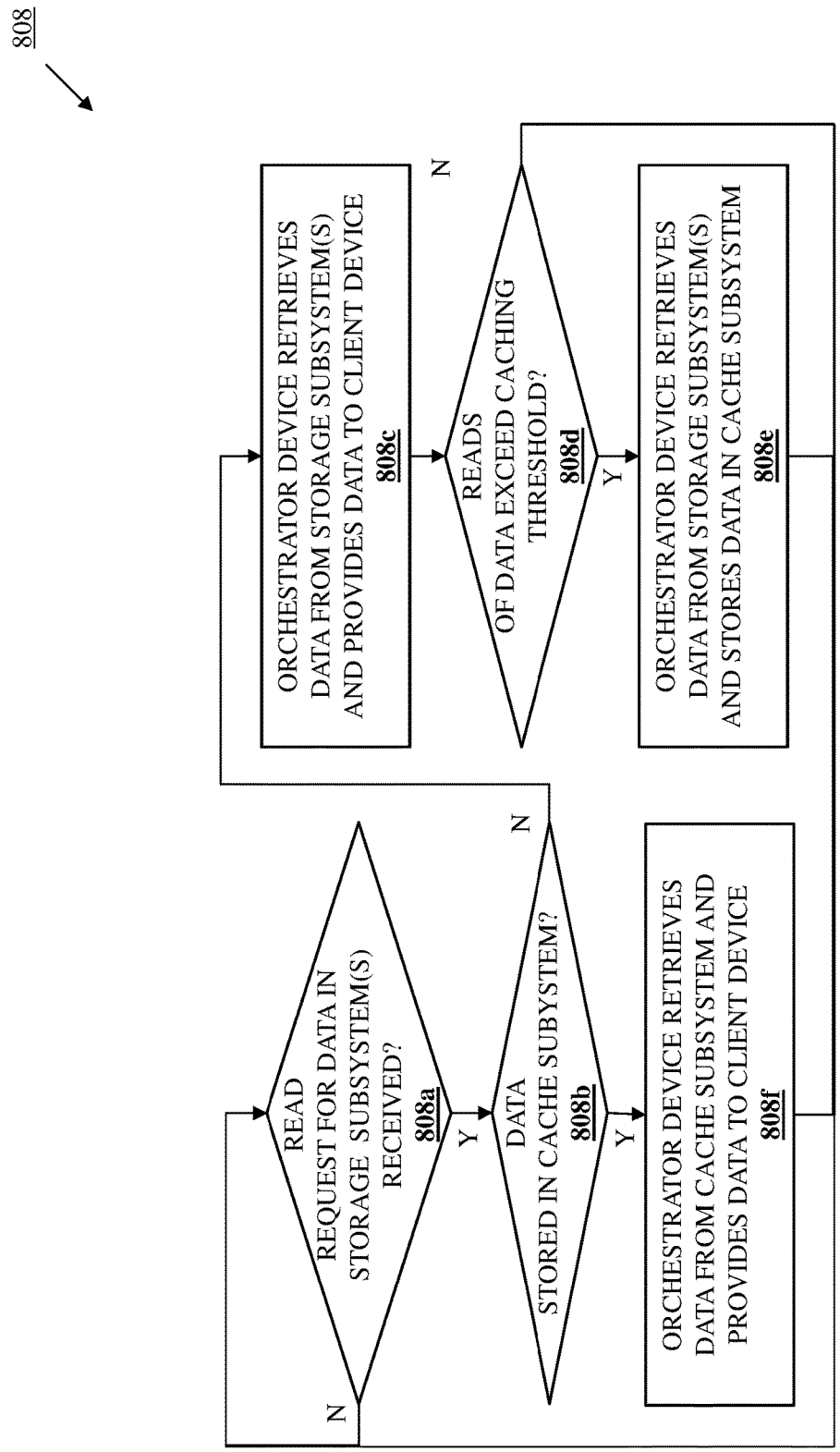
FIG. 8B is a flow chart illustrating an embodiment of a portion of the method of FIG. 8A.

With reference to FIG. 8B, an embodiment of block 808 of the method 800 is illustrated that describes the operations performed when the orchestrator device operates with read data caching for the storage subsystem(s) enabled as long as a client device has exclusive access to the storage subsystem(s). As such, as the method 800 loops at block 808 and decision block 810, the operations at block 808 may proceed as illustrated in FIG. 8B and described below.

As such, the operation of the orchestrator device with read data caching enabled for the storage subsystem(s) may begin at decision block 808a where the orchestrator device determines whether a read request for data in the storage subsystem(s) has been received. In an embodiment, at decision block 808a, the cache agent 710a in the orchestrator engine 710 of the orchestrator device 708 may monitor for read requests from the client device 702a that has exclusive access to the storage volume in the storage device provided by the resource device 718, discussed in further detail below. If, at decision block 808a, it is determined that no read request for data in the storage subsystem has been received, the method 800 returns to block 808a. As such, the method 800 may loop such that the orchestrator device 708 monitors for read requests from the client device 702s as long the client device 702a has exclusive access to the storage volume such that read data caching for the storage volume is enabled.

Figure 11A:
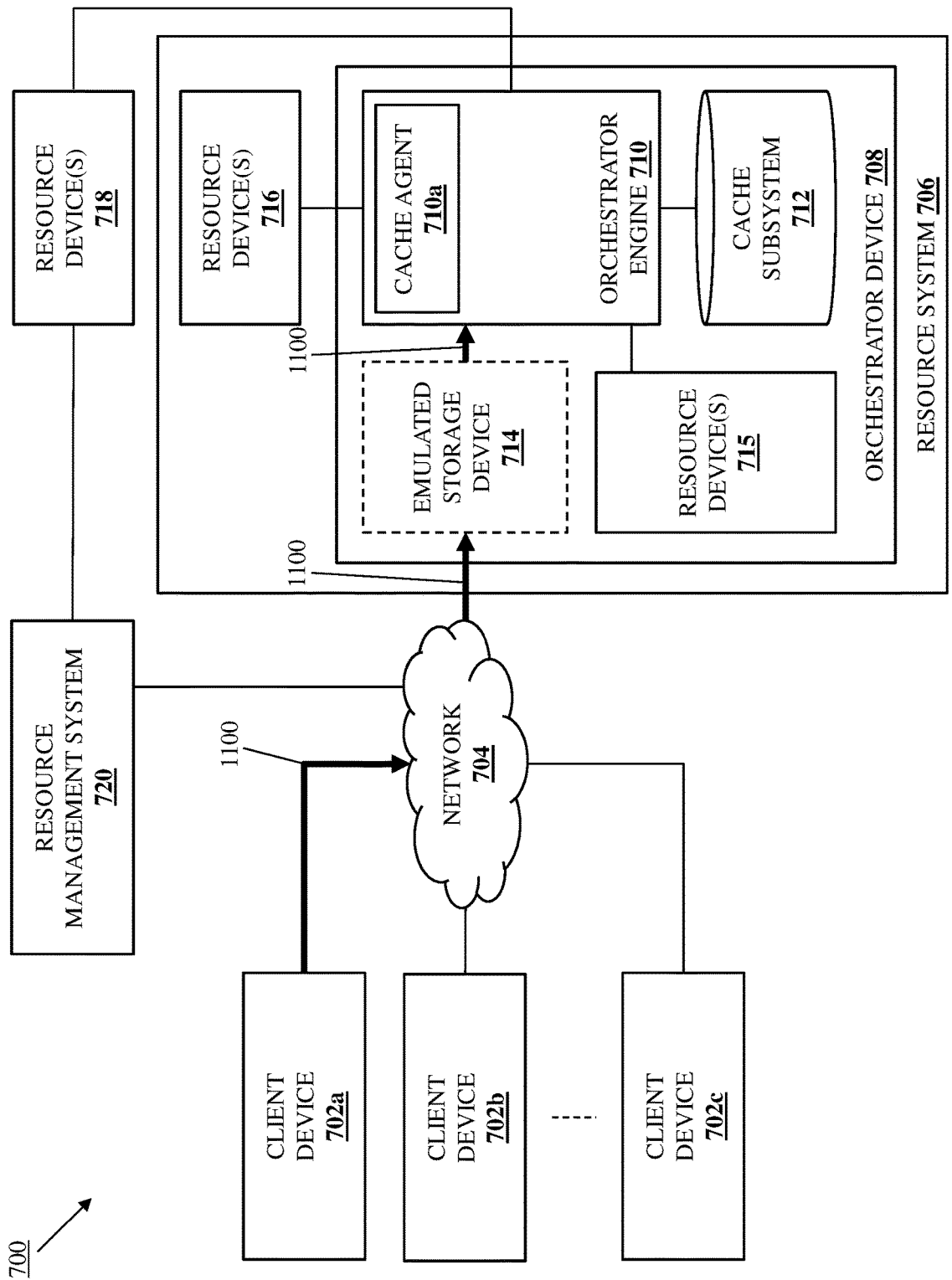
FIG. 11A is a schematic view illustrating an embodiment of the LCS data provisioning system of FIG. 7 operating during the method of FIG. 8.

If, at decision block 808a, it is determined that a read request for data in the storage subsystem has been received, the method 800 proceeds to decision block 808b where the orchestrator device determines whether the data is stored in a cache subsystem. With reference to FIG. 11A, in an embodiment of decision block 808a, the client device 702a may perform data read request operations 1100 that may include providing a read request for data stored in the storage volume through the network 704 to the emulated storage device 714 (e.g., by providing that read request in a submission queue in the client device 702a and ringing a doorbell of the emulated storage device 714 to cause the emulated storage device 714 to retrieve that read request from the submission queue in the client device 702a and provide that read request to the orchestrator engine 710). As such, in this embodiment of decision block 808a, the orchestrator engine in the orchestrator device 708 will determine that a read request for data in the storage volume has been received from the client device 702a, and the method 800 will proceed to decision block 808b.

In an embodiment, at decision block 808b, the cache agent 710a in the orchestrator engine 710 of the orchestrator device 708 may determine whether the data identified in the read request received from the client device 702a at decision block 808a is stored in the cache subsystem 712. As will be appreciated by one of skill in the art in possession of the present disclosure, the cache agent 710a in the orchestrator engine 710 may use a variety of techniques in order to determine whether the data being requested in the read request was previously stored in the cache subsystem 712, and any of those techniques will fall within the scope of the present disclosure. As discussed below, the orchestrator engine 710 may be configured to cache data chunks that includes data requested in a read request along with other data, with that cached data chunk allowing the subsequent read requests for the data to be satisfied from the cache subsystem 712, which provides for more efficient decompression operations. As such, if the client device 702a requests 4 KB of data that is included in a 64 KB data chunk that was previously decompressed and stored in the storage volume, the orchestrator device 710 may retrieve the 4 KB of data from the cache subsystem 712 and provide it to the client device 702a, with the entire 64 KB data chunk remaining stored in the cache system 712 for future read requests.

Figure 11B:
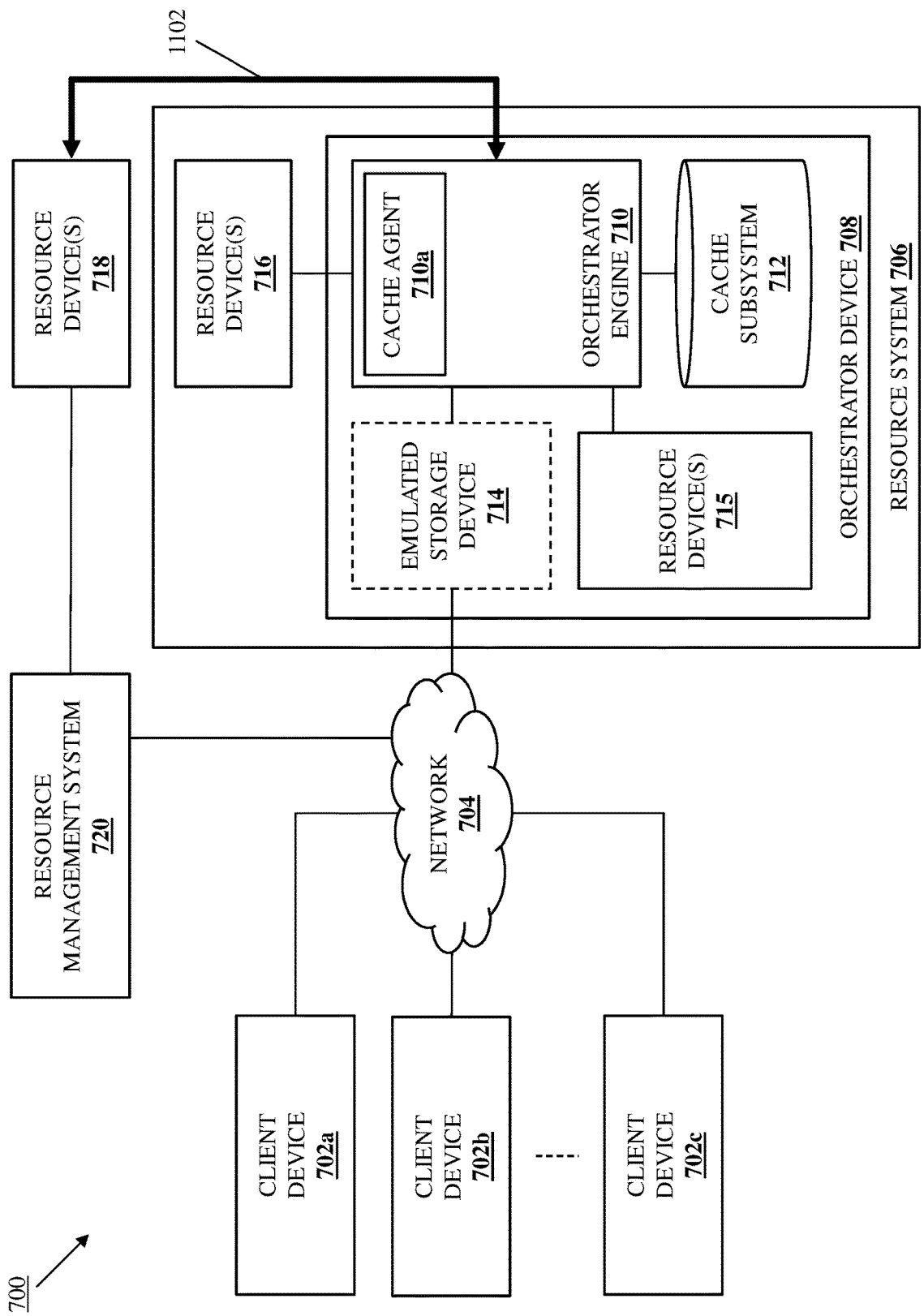
FIG. 11B is a schematic view illustrating an embodiment of the LCS data provisioning system of FIG. 7 operating during the method of FIG. 8.

If, at decision block 808b, it is determined that the data is not stored in the cache subsystem, the method 800 proceeds to block 808c where the orchestrator device retrieves the data from the storage subsystem(s) and provides the data to the client device. With reference to FIG. 11B, in an embodiment of block 808c and in response to determining that the data being requested by the client device 702a is not stored in the cache subsystem 712, the orchestrator engine 710 in the orchestrator device 708 may perform data retrieval operations 1102 that may include providing a read instruction for the data to the storage volume in the storage device provided by the resource device 718 (e.g., by transmitting a read instruction to the resource system (e.g., a server device) that includes the storage device providing the storage volume). In response to receiving the read instruction, the data stored in the storage volume may be retrieved (e.g., by the resource system (e.g., a server device) that includes the storage device providing the storage volume) and provided to the orchestrator device 708. In some examples, storage services such as decompression, decryption, and/or other storage services that would be apparent to one of skill in the art in possession of the present disclosure may be performed on the data retrieved from the storage volume prior to transmitting that data to the orchestrator device 708 (e.g., by the storage device providing that storage volume, by the resource system that includes that storage volume, by an orchestrator device in the resource system that includes that storage volume, etc.).

Figure 11C:
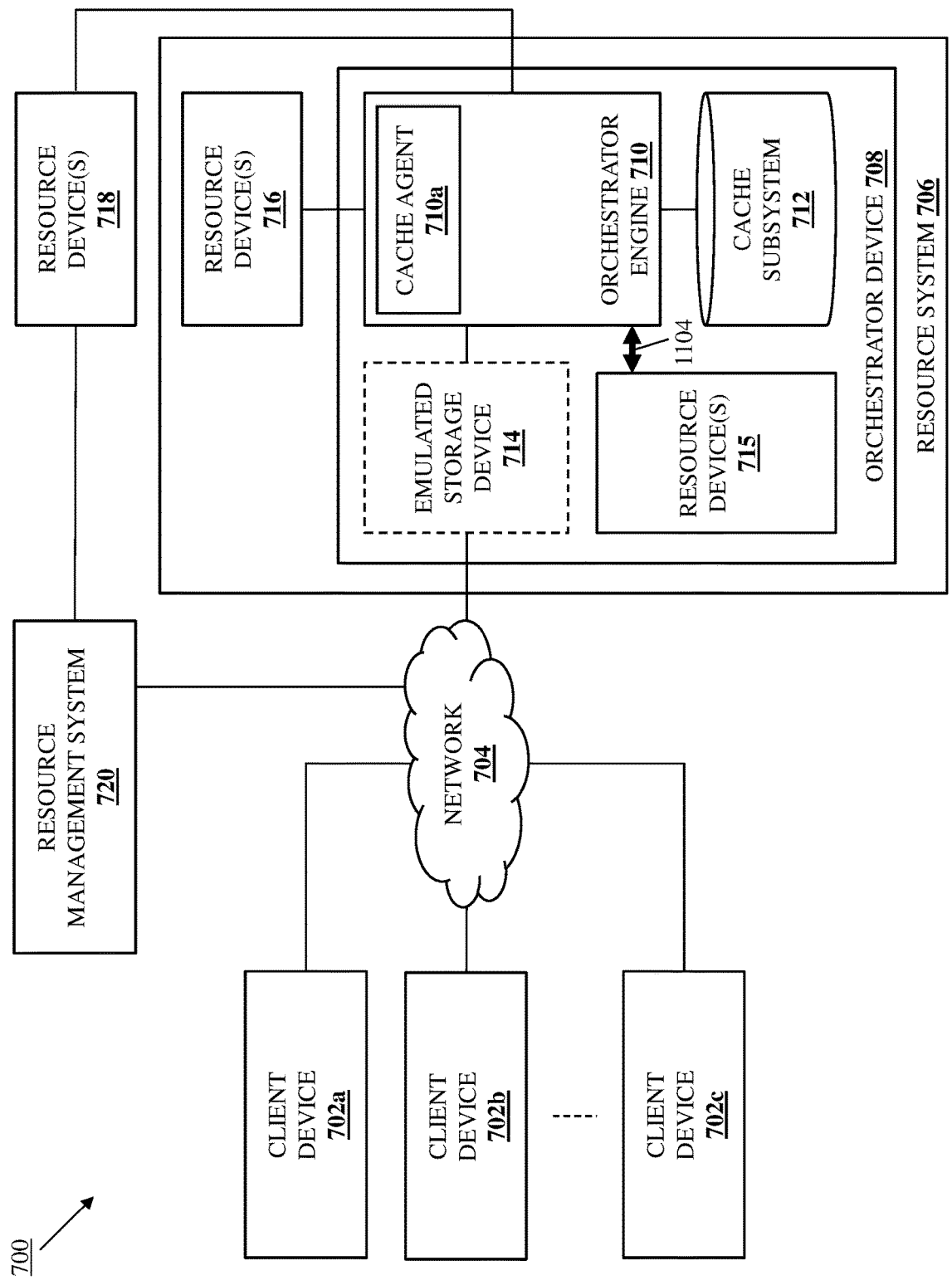
FIG. 11C is a schematic view illustrating an embodiment of the LCS data provisioning system of FIG. 7 operating during the method of FIG. 8.

In other examples, the data retrieved from the storage volume may be transmitted to the orchestrator device 708 without performing storage services such as decompression, decryption, and/or other storage services that would be apparent to one of skill in the art in possession of the present disclosure. With reference to FIG. 11C, in such examples in which the data retrieved from the storage volume is transmitted to the orchestrator device 708 without performing storage services (e.g., that data is transmitted compressed, encrypted, and/or in any other state that requires the storage services described herein), the orchestrator engine 710 in the orchestrator device 708 may perform storage service operations 1104 that may include providing that data to the resource device(s) 715 (which as discussed above may include decompression hardware, decryption hardware, and/or other storage service hardware that would be apparent to one of skill in the art in possession of the present disclosure) such that the resource device(s) 715 perform the storage services such as decompression, decryption, and/or other storage services on that data before providing that data back to the orchestrator engine 710.

Figure 11D:
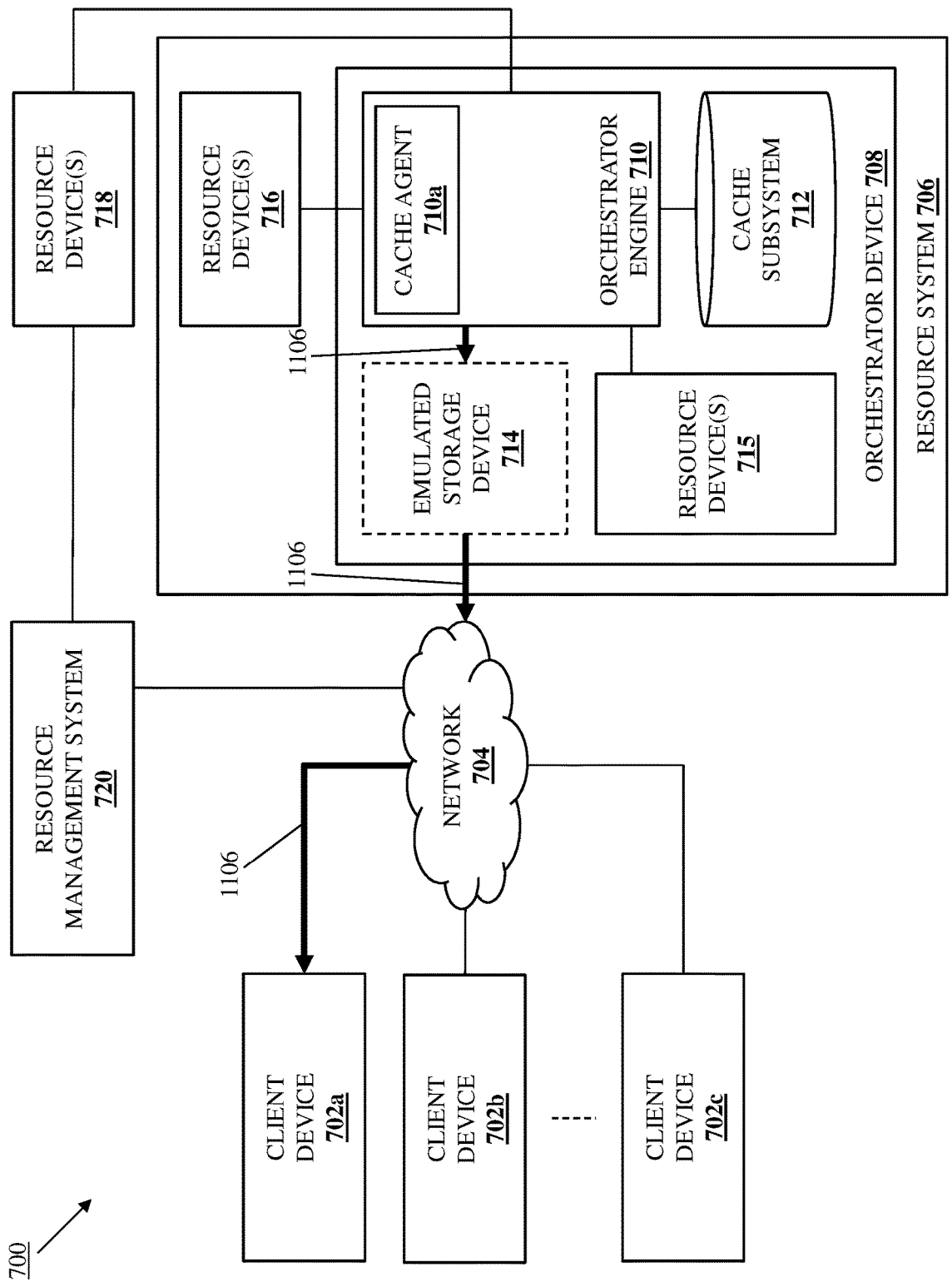
FIG. 11D is a schematic view illustrating an embodiment of the LCS data provisioning system of FIG. 7 operating during the method of FIG. 8.

With reference to FIG. 11D, at block 808c the orchestrator engine 710 may then perform data provisioning operations 1106 that may include providing the data (i.e., decompressed, unencrypted data) via the emulated storage device 714 and through the network 704 to the client device 702a. As such, the client device 702a may read data stored in the storage volume in the storage device provided by the resource device(s) 718 at block 808, and one of skill in the art in possession of the present disclosure will appreciate how the storage service operations performed on that data before that data is provided to a client device may introduce the read latency discussed above. Furthermore, while a specific example of the operation of the LCS data provisioning system 700 with read data caching enabled for a storage volume exclusively accessed by a client device 702a has been described, one of skill in the art in possession of the present disclosure will appreciate how the LCS data provisioning system 700 may operate in other manners with read data caching enabled while remaining within the scope of the present disclosure as well.

The method 800 then proceeds to decision block 808d where the orchestrator device determines whether reads of the data are exceeding a caching threshold. In an embodiment, at decision block 808d, the cache agent 710a in the orchestrator engine 710 of the orchestrator device 708 may monitor the reads of data stored in the storage volume in the storage device provided by the resource device 718 to determine whether reads of that data are exceeding a caching threshold. As will be appreciated by one of skill in the art in possession of the present disclosure, the caching threshold described herein may identify a number of reads, a number of reads during a particular time period, and/or any other read frequency information that one of skill in the art in possession of the present disclosure would recognize may be utilized to determine whether the caching of the data corresponding to those reads is justified based on any of a variety of policies. As such, in a specific example and following the retrieval of the data from the storage volume at block 808c, the orchestrator engine 710 may determine whether that read, when considered in light of other previous reads of that data, exceeded the caching threshold discussed above.

However, while the determination of whether the reads of data exceed a caching threshold is described as being performed immediately following a read of data from the storage volume in the storage device provided by the resource device 718 (i.e., when that data was requested by the client device 702a and not stored in the cache subsystem 712), one of skill in the art in possession of the present disclosure will appreciate how data stored in the storage volume may be analyzed at other times during block 808 to determine whether its associated reads have exceeded a caching threshold while remaining within the scope of the present disclosure as well.

If, at decision block 808d, it is determined that reads of the data are not exceeding the caching threshold, the method 800 returns to block 808a. As such, the method 800 may loop such that, as long as the orchestrator device 708 receives read requests from the client device 702a for data stored in the storage volume that is not stored in the cache subsystem 712 and for which reads are not exceeding the caching threshold, the orchestrator device 708 will retrieve that data from the storage volume and provide it to the client device 702a.

If, at decision block 808d, it is determined that reads of the data are exceeding the caching threshold, the method 800 may proceed to block 808e where the orchestrator device retrieves the data from the storage subsystem(s) and stores the data in the cache subsystem. As will be appreciated by one of skill in the art in possession of the present disclosure, in the event that it is determined at decision block 808d that the reads for the data retrieved at block 808c have exceeded the caching threshold, that data will have already been retrieved from the storage volume in the storage device provided by the resource device(s) 718, and the data retrieval portion of block 808e may be skipped. However, as discussed above, data stored in the storage volume may be analyzed at times other than following its retrieval in response to a read request from the client device 702a in order to determine whether its associated reads have exceeded a caching threshold, and thus the data retrieval portion of block 808e will be performed in such situations.

Figure 12A:
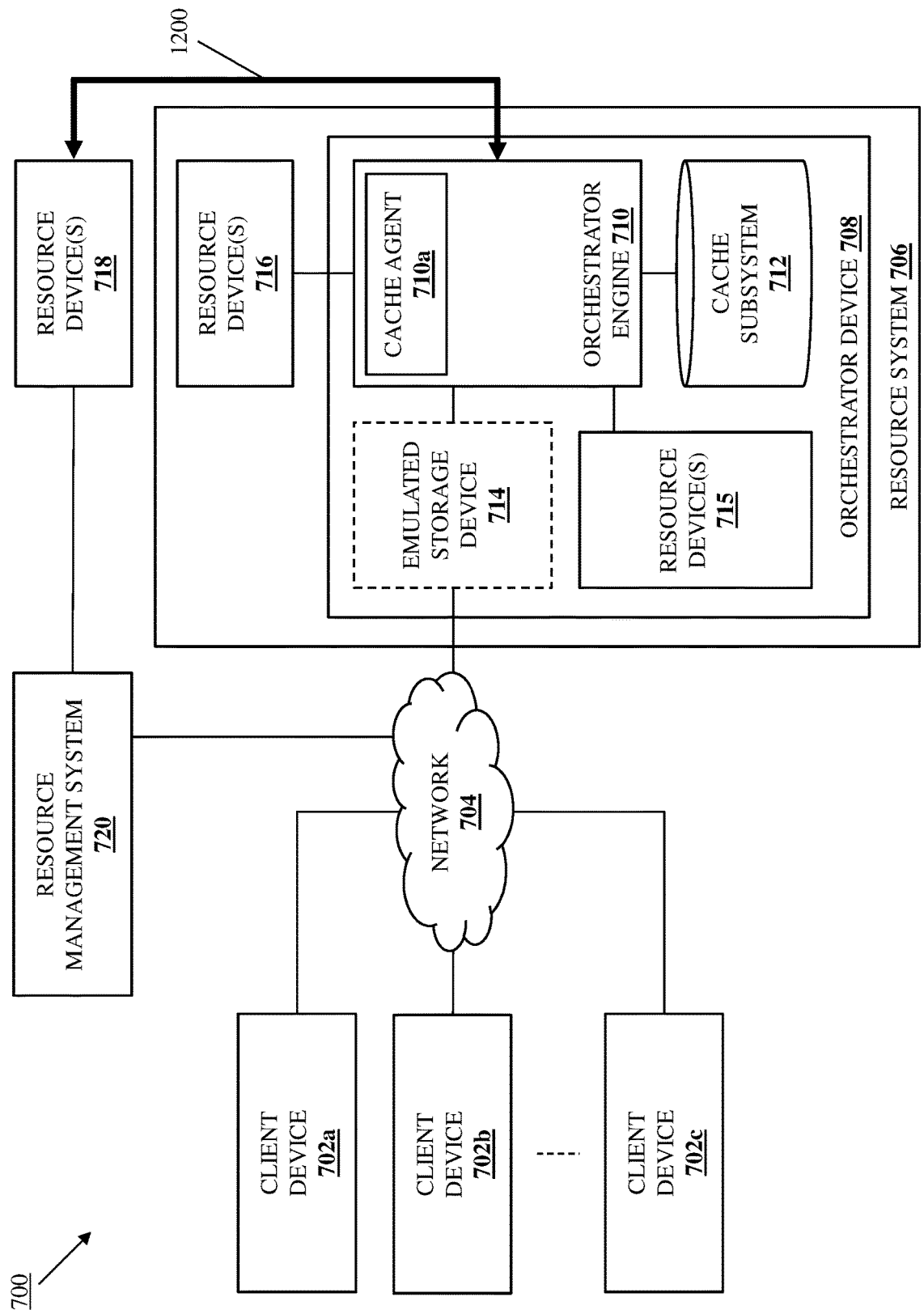
FIG. 12A is a schematic view illustrating an embodiment of the LCS data provisioning system of FIG. 7 operating during the method of FIG. 8.

With reference to FIG. 12A, in an embodiment of block 808e and in response to determining that reads for data stored in the storage volume in the storage device provided by the resource device(s) 718 have exceeded the caching threshold, the orchestrator engine 710 in the orchestrator device 708 may perform data retrieval operations 1200 that may include providing a read instruction for the data to the storage volume in the storage device provided by the resource device(s) 718 (e.g., by transmitting a read instruction to the resource system (e.g., a server device) that includes the storage device providing the storage volume). In response to receiving the read instruction, the data stored in the storage volume may be retrieved (e.g., by the resource system (e.g., a server device) that includes the storage device providing the storage volume) and provided to the orchestrator device 708. In some examples, storage services such as decompression, decryption, and/or other storage services that would be apparent to one of skill in the art in possession of the present disclosure may be performed on the data retrieved from the storage volume prior to transmitting that data to the orchestrator device 708 (e.g., by the storage device providing that storage volume, by the resource system that includes that storage volume, by an orchestrator device in the resource system that includes that storage volume, etc.).

Figure 12B:
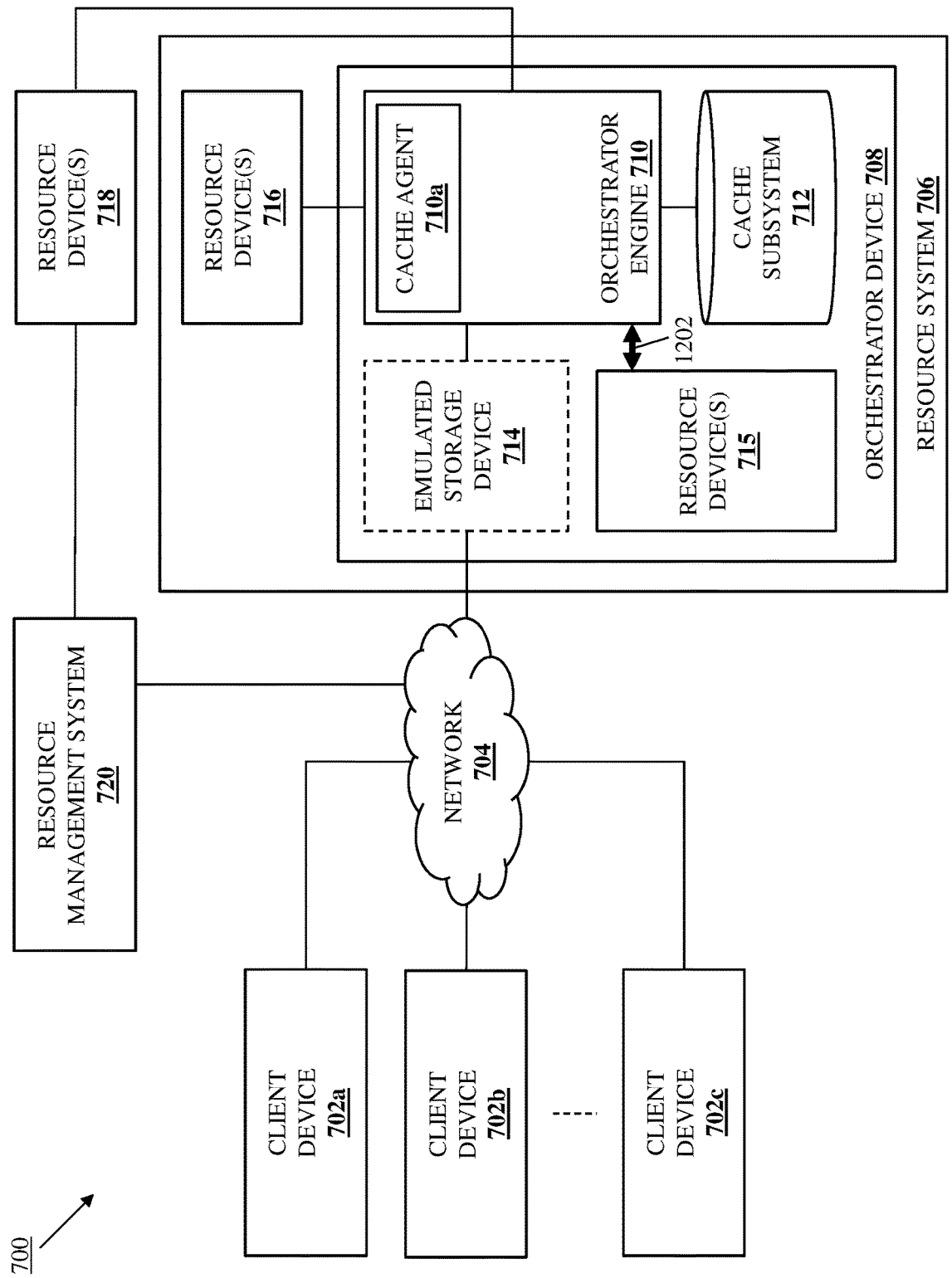
FIG. 12B is a schematic view illustrating an embodiment of the LCS data provisioning system of FIG. 7 operating during the method of FIG. 8.

In other examples, the data retrieved from the storage volume may be transmitted to the orchestrator device 708 without performing storage services such as decompression, decryption, and/or other storage services that would be apparent to one of skill in the art in possession of the present disclosure. With reference to FIG. 12B, in such examples in which the data retrieved from the storage volume is transmitted to the orchestrator device 708 without performing storage services (e.g., that data is transmitted compressed, encrypted, and/or in any other state that requires the storage services described herein), the orchestrator engine 710 in the orchestrator device 708 may perform storage service operations 1202 that may include providing that data to the resource device(s) 715 (which as discussed above may include decompression hardware, decryption hardware, and/or other storage service hardware that would be apparent to one of skill in the art in possession of the present disclosure) such that the resource device(s) 715 perform the storage services such as decompression, decryption, and/or other storage services on that data before providing that data back to the orchestrator engine 710.

Furthermore, in some embodiments, the orchestrator engine 710 in the orchestrator device 708 may operate to identify a data chunk in the storage volume in the storage device provided by the resource device 718 that includes the data for which reads have exceeded the caching threshold and that includes a data chunk size that exceeds a storage service efficiency threshold, and may either have the decompression, decryption, and/or other storage services performed on the data chunk prior to it being transmitted to the orchestrator device 718, or may retrieve that data chunk and perform the decompression, decryption, and/or other storage services on the data chunk similarly as discussed above. For example, if the client device 702a provides a a request for data from Logical Block Address (LBA) X and a determination is made that the requested data exceeds the caching threshold, the cache agent 710a in the orchestrator engine 710 may identify (e.g., based on a policy) a set of adjacent LBAs that may be "pre-fetched" from the storage volume, with the set of adjacent LBAs forming a "locality domain" (e.g., a locality domain defined by [(LBA X−largest LBA)−(LBA X−smallest LBA)] that is pre-fetched from the storage volume) of LBAs (e.g., a data chunk) that may then be cached for subsequent reads for data included in any LBA included in the data chunk.

As such, the orchestrator engine 710 may be configured to read a data chunk that includes particular data requested in a read request along with other data, decompress that entire data chunk, and cache that decompressed data chunk to allow subsequent read requests for the particular data to be satisfied from the cache subsystem 712, which as discussed below provides for more efficient decompression operations. As such, if the client device 702a requests 4 KB of data that is included in a 64 KB data chunk, the orchestrator device 710 may retrieve the 64 KB data chunk from the cache subsystem 712 that includes the requested 4 KB of data, decompress the 64B data chunk, store the decompressed 64 KB data chunk in the cache subsystem 712, and provide the requested 4 KB of data to the client device 702a, with the entire 64 KB data chunk remaining stored in the cache system 712 for future read requests. As will be appreciated by one of skill in the art in possession of the present disclosure, the storage services (e.g., decompression) discussed above may be performed more efficiently on relatively larger data chunks, and thus the identification of the data chunk that includes the data for which reads have exceeded the caching threshold and that includes a data chunk size that exceeds a storage service efficiency threshold may allow for more efficient performance of the storage services discussed above.

With reference to FIG. 12C, in an embodiment of block 808e and following the receipt of the decompressed, decrypted data, or following the decompressing and decrypting of that data at the orchestrator device 708, the orchestrator engine 710 in the orchestrator device 708 may perform data caching operations 1204 that include storing that data in the cache subsystem 712. As such, following block 808e, the data for which reads have exceeded the caching threshold will be stored in the cache subsystem 712 in the orchestrator device 708, and the method 800 then returns to block 808a. Thus, the method 800 may loop such that, when the orchestrator device 708 identifies data stored in the storage volume for which reads are exceeding the caching threshold, the orchestrator device 708 may retrieve that data from the storage volume and provide it in the cache subsystem 712.

Figure 13A:
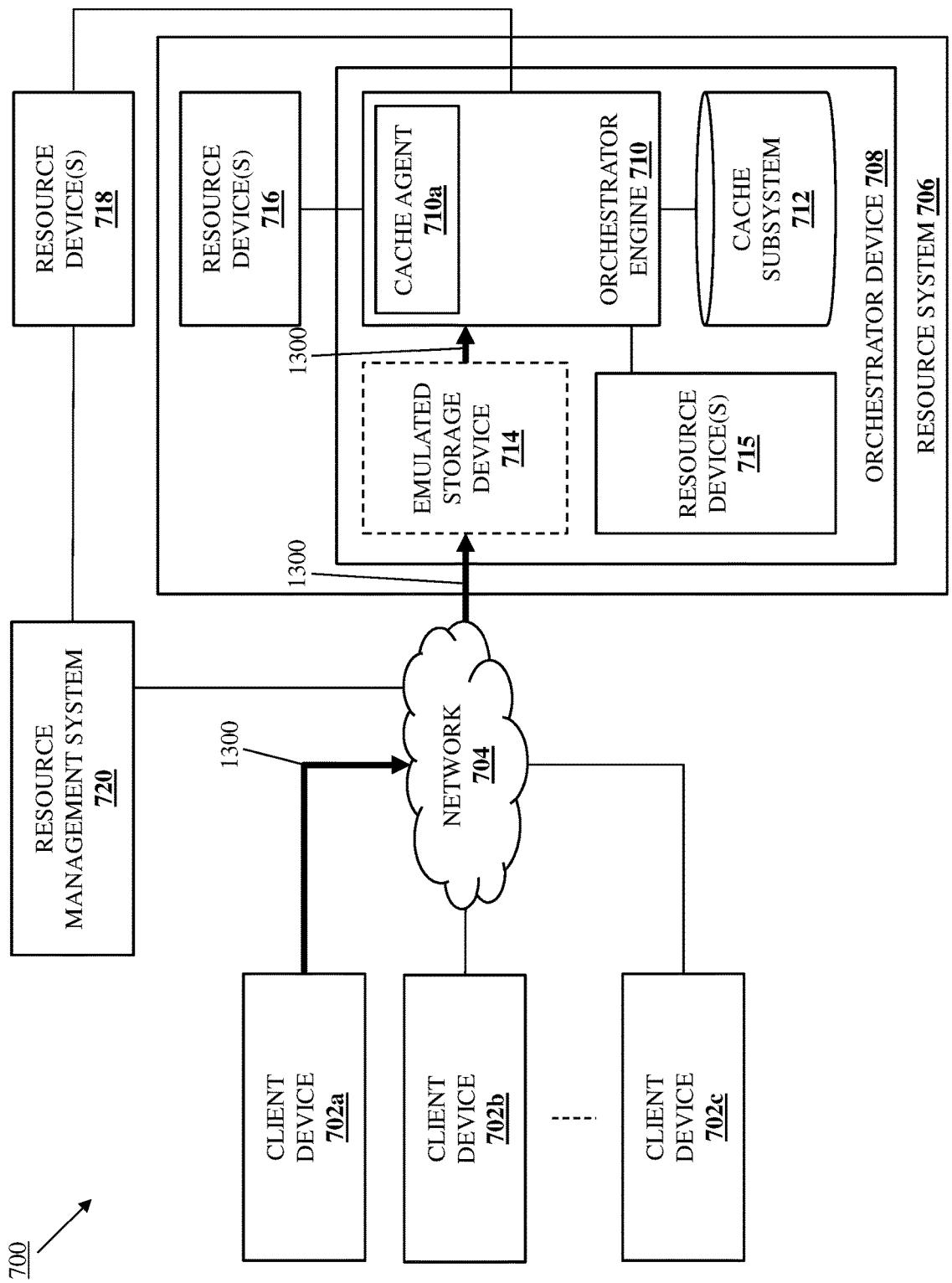
FIG. 13A is a schematic view illustrating an embodiment of the LCS data provisioning system of FIG. 7 operating during the method of FIG. 8.

If, at decision block 808b, it is determined that the data is stored in the cache subsystem, the method 800 proceeds to block 808f where the orchestrator device retrieves the data from the cache subsystem and provides the data to the client device. With reference to FIG. 13A, an embodiment of decision block 808a is illustrated in which a read request is received from the client device 702a. Similarly as described above, the client device 702a may perform data read request operations 1300 that may include providing a read request for data stored in the storage volume through the network 704 to the emulated storage device 714 (e.g., by providing that read request in a submission queue in the client device 702a and ringing a doorbell of the emulated storage device 714 to cause the emulated storage device 714 to retrieve that read request from the submission queue in the client device 702a and provide that read request to the orchestrator engine 710). As such, in this embodiment of decision block 808a, the orchestrator engine in the orchestrator device 708 will determine that a read request for data in the storage volume has been received from the client device 702a, and the method 800 will proceed to decision block 808b.

Figure 13B:
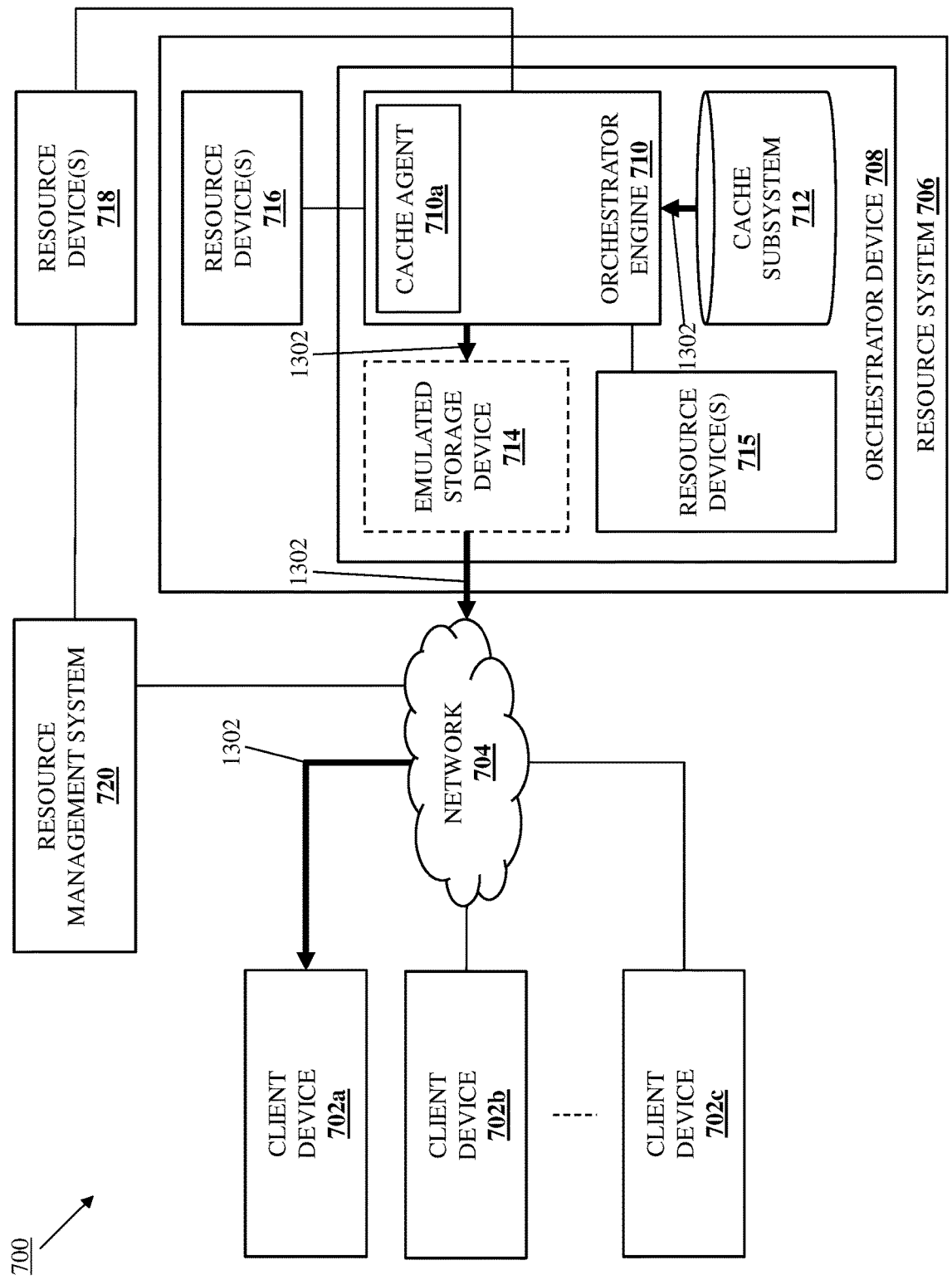
FIG. 13B is a schematic view illustrating an embodiment of the LCS data provisioning system of FIG. 7 operating during the method of FIG. 8.

In this embodiment of decision block 808b, the cache agent 710a in the orchestrator engine 710 of the orchestrator device 708 may determine that the data identified in the read request received from the client device 702a at decision block 808a is stored in the cache subsystem 712. As such, with reference to FIG. 13B, in an embodiment of block 808f, the orchestrator engine 710 in the orchestrator device 708 may perform cached data provisioning operations 1302 that may include retrieving the data stored in the cache subsystem 712, and providing the data (i.e., decompressed, unencrypted data) via the emulated storage device 714 and through the network 704 to the client device 702a. As such, the client device 702a may be provided data stored in the cache subsystem 712 block 808, and one of skill in the art in possession of the present disclosure will appreciate how the storage service operations discussed above do not need to be performed on that data before that data is provided to a client device (i.e., due to those storage services having already been performed prior to storing the data in the cache subsystem 712), reducing the read latency discussed above. Furthermore, because the client device 702a has exclusive access to the storage volume, cache consistency issues that would result from sharing the storage volume will not be present in the cache subsystem 712. Following block 808f, the method 800 then returns to block 808a. As such, the method 800 may loop such that, as long as the orchestrator device 708 receives read requests from the client device 702a for data stored in the cache subsystem 712, the orchestrator device 708 will retrieve that data from the cache subsystem 712 and provide it to the client device 702a Referring back to FIG. 8A, if at decision block 810 it is determined that the client device does not has exclusive access to the storage subsystem(s), the method 800 proceeds to block 812 where the orchestrator device disables read data caching for the storage subsystem(s). Similarly as discussed above, in an embodiment of decision block 810, the orchestrator engine 710 in the orchestrator device 708 may monitor the storage volume in the storage device provided by the resource device 718 to determine whether two or more of the client devices have access to that storage volume. As discussed above, storage volume allocation/mapping requests may be generated by the resource management system 720 for the storage volume in the storage device provided by the resource device 718 in order to provide access to that storage volume to any of the client devices 702a-702c. In one example and in response to the storage volume allocation/mapping requests discussed above, the orchestrator device 708 may be notified (e.g., by the resource system that includes the storage volume and that receives the storage volume storage volume allocation/mapping requests) when access to the storage volume has been granted to another client device such that the storage volume is now shared, and thus the monitoring at decision block 804 may include monitoring for such notifications. However, one of skill in the art in possession of the present disclosure will appreciate how the orchestrator device 708 may determine whether a client device no longer has exclusive access to a storage subsystem in a variety of manners that will fall within the scope of the present disclosure as well.

Figure 14A:
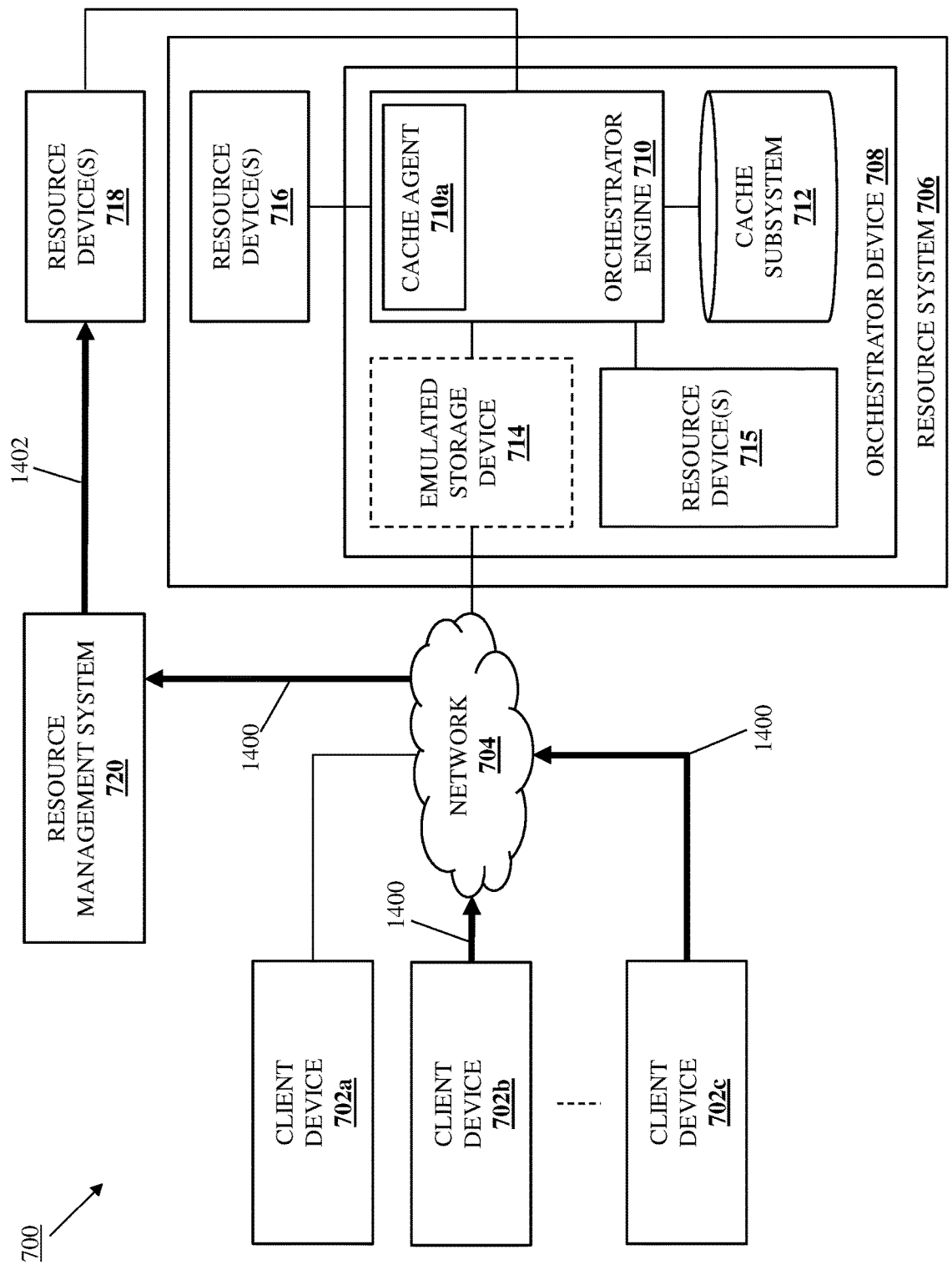
FIG. 14A is a schematic view illustrating an embodiment of the LCS data provisioning system of FIG. 7 operating during the method of FIG. 8.

With reference to FIG. 14A, in an embodiment of decision block 810, one or more of the client devices 702b and 702c may have performed storage volume allocation/mapping operations 1400 that includes performing operation(s) that indicate via the network 704 to the resource management system 720 that the storage volume in the storage device provided by the resource device 718 is needed and/or otherwise should be allocated/mapped to that client device. For example, a new LCS may be provisioned that requires a boot storage devices and storage for application data that is satisfied by the storage volume in the storage device provided by the resource device 718. In another example, an LCS may be running out of storage capacity, and the storage volume in the storage device provided by the resource device 718 may provided additional needed capacity for that LCS. In yet another example, an application such as a backup application, Machine Learning application, or other application known in the art may require existing data that was generated by an LCS with exclusive access to the storage volume in the storage device provided by the resource device 718, and thus may require shared access to that storage volume to retrieve that existing data. In yet another example, a server cluster provided using a MICROSOFT® AZURE® HYPER-V® hypervisor from MICROSOFT® Corporation of Redmond, Washington, United States, or a VMWARE® ESXi® hypervisor from VMWARE® Inc. of Palo Alto, California, United States, may require shared access to the storage volume in the storage device provided by the resource device 718 in order to access the storage volume.

In response to the allocation/mapping operations 1400, the resource management system 720 may then perform storage volume allocation/mapping instruction operations 1402 that may include transmitting storage volume allocation/mapping instructions that cause one or more of the client devices 702b and 702c to be allocated/mapped to the storage volume in the storage device provided by the resource device(s) 718. For example, the resource management system 720 may transmit the storage volume allocation/mapping instructions to a resource system (e.g., a server device) that includes the storage device providing the storage volume, and the resource system (e.g., an orchestrator device in that resource system) may operate to allocate/map one or more of the client devices 702b and 702c to that storage volume.

With reference to FIG. 14B, in an embodiment of decision block 810 and in response to one or more of the client devices 702b and 702c having been allocated/mapped to the storage volume in the storage device provided by the resource device(s) 718, shared access identification operations 1404 may be performed to notify the cache agent 710a in the orchestrator engine 710 of the orchestrator device 708 that the client device 702a and client devices 702b and/or 702c have shared access to that storage volume. For example, in response to one or more of the client devices 702b and 702c having been allocated/mapped to the storage volume as discussed above, the resource system (e.g., a server device) that includes the storage device providing the storage volume may perform the shared access identification operations 1404 that include transmitting a storage volume shared access notification to the cache agent 710a that notifies the cache agent 710a that the client device 702a and client devices 702b and/or 702c have shared access to the storage volume. However, while a specific example of the notification of the orchestrator device 708 that client devices have shared access to the storage volume has been provided, one of skill in the art in possession of the present disclosure will appreciate that the orchestrator device 708 may identify shared access by client devices to a storage volume in a variety of manners that will fall within the scope of the present disclosure as well.

As such, in an embodiment of block 812 and in response to identifying that the client device 702a and client devices 702b and/or 702c have shared access to the storage volume in the storage device provided by the resource device(s) 718, the cache agent 710a in the orchestrator engine 710 of the orchestrator device 708 may disable read data caching for that storage volume. For example, at block 812 the cache agent 710a may disable the read data caching discussed above by removing a register setting in an orchestrator device processing system, removing a flag in an orchestrator device memory system, and/or performing any of a variety of other operations that one of skill in the art in possession of the present disclosure would recognize as preventing the read data caching operations discussed above for the storage volume from being performed. Following block 812, the method 800 then returns to block 802.

Thus, systems and methods have been described that enable read caching for storage subsystem(s) in a Logically Composed System (LCS) provisioning system that are exclusively accessed by a client device in order to reduce data read latency for data stored in those storage subsystem(s), while disabling read caching for the storage subsystem(s) when they are accessible by multiple client devices in order to prevent cache issues that are introduced when multiple different client devices have access to the same storage subsystem(s). For example, the LCS data provisioning system of the present disclosure may include an orchestrator device that includes a cache subsystem and that is coupled to client devices and storage subsystem(s). When the orchestrator device identifies that a first client device has exclusive access to the storage subsystem(s), it activates read data caching for the storage subsystem(s). The orchestrator device then receives a first read request from the first client device that is directed to first data that is stored in the storage subsystem(s) and, in response, retrieves the first data from the cache subsystem and provides the first data to the first client device. When the orchestrator device identifies that the first client device no longer has exclusive access to the storage subsystem(s), it deactivates the read data caching for the storage subsystem(s). As such, read latency is reduced in client device/storage subsystem exclusive access scenarios without requiring relatively complicated data coordination algorithms and otherwise incurring relatively high amounts of storage operation overhead that occurs in multi-client-device/storage subsystem shared access scenarios.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Logically Composed System (LCS) data provisioning system, comprising:
    a plurality of client devices;
    at least one storage subsystem; and
    an orchestrator device that includes a cache subsystem and that is coupled to the plurality of client devices and the at least one storage subsystem, wherein the orchestrator device is configured to:
        identify that a first client device that is included in the plurality of client devices has exclusive access to the at least one storage subsystem;
        activate, in response to identifying that the first client device has exclusive access to the at least one storage subsystem, read data caching for the at least one storage subsystem and, while the first client device maintains exclusive access to the at least one storage subsystem:
            receive, from the first client device, at least one first read request that is directed to first data that is stored in the at least one storage subsystem;
            retrieve, in response to receiving the at least one first read request, the first data from the cache subsystem; and
            provide the first data to the first client device;
        identify that none of the plurality of client devices has exclusive access to the at least one storage subsystem; and
        deactivate, in response to determining that none of the plurality of client devices has exclusive access to the at least one storage subsystem, the read data caching for the at least one storage subsystem such that, while none of the plurality of client devices has exclusive access to the at least one storage subsystem, data identified in read requests that are received from any of the plurality of client devices and that are directed to the at least one storage subsystem is not retrieved from the cache subsystem.

2. The system of claim 1, wherein the orchestrator device is configured, while the first client device maintains exclusive access to the at least one storage subsystem, to:
    determine, prior to receiving the at least one first read request, that the first data has been subject to read requests that exceed a data caching threshold; and store, in response to determining that the first data has been subject to the read requests that exceed the data caching threshold, the first data in the cache subsystem.

3. The system of claim 2, wherein the orchestrator device is configured, while the first client device maintains exclusive access to the at least one storage subsystem to:
identify, in the at least one storage subsystem, a data chunk that includes the first data and that exceeds a storage service efficiency threshold;
retrieve the data chunk; and
perform a storage service on the data chunk in order to retrieve the first data that is stored in the cache subsystem.

4. The system of claim 1, wherein the orchestrator device is configured, while the first client device maintains exclusive access to the at least one storage subsystem to:
receive, from the first client device, a second read request that is directed to second data that is stored in the at least one storage subsystem;
determine, in response to receiving the second read request, that the second data is stored in the at least one storage subsystem;
retrieve, in response to determining that the second data is stored in the at least one storage subsystem, the second data from the at least one storage subsystem; and
provide the second data to the first client device.

5. The system of claim 1, wherein the orchestrator device is configured to:
present, to the first client device, the at least one storage subsystem as an emulated storage device.

6. The system of claim 1, wherein the orchestrator device is configured to identify that the first client device has exclusive access to the at least one storage subsystem by:
receiving, from the at least one storage subsystem, a notification that the first client device has exclusive access to the at least one storage subsystem.

7. An Information Handling System (IHS), comprising:
a processing system; and
a memory system that is coupled to the processing system and that includes instructions that, when executed by the processing system, cause the processing system to provide an orchestrator engine that is configured to:
identify that a first client device has exclusive access to at least one storage subsystem;
activate, in response to identifying that the first client device has exclusive access to the at least one storage subsystem, read data caching for the at least one storage subsystem and, while the first client device maintains exclusive access to the at least one storage subsystem:
receive, from the first client device, at least one first read request that is directed to first data that is stored in the at least one storage subsystem;
retrieve, in response to receiving the at least one first read request, the first data from a cache subsystem; and
provide the first data to the first client device;
identify that none of the plurality of client devices has exclusive access to the at least one storage subsystem; and
deactivate, in response to determining that none of the plurality of client devices has exclusive access to the at least one storage subsystem, the read data caching for the at least one storage subsystem such that, while none of the plurality of client devices has exclusive access to the at least one storage subsystem, data identified in read requests that are received from any of the plurality of client devices and that are directed to the at least one storage subsystem is not retrieved from the cache subsystem.

8. The IHS of claim 7, wherein the orchestrator engine is configured to:
determine, while the first client device maintains exclusive access to the at least one storage subsystem and prior to receiving the at least one first read request, that the first data has been subject to read requests that exceed a data caching threshold; and
store, while the first client device maintains exclusive access to the at least one storage subsystem and in response to determining that the first data has been subject to the read requests that exceed the data caching threshold, the first data in the cache subsystem.

9. The IHS of claim 8, wherein the orchestrator engine is configured to:
identify, in the at least one storage subsystem while the first client device maintains exclusive access to the at least one storage subsystem, a data chunk that includes the first data and that exceeds a storage service efficiency threshold;
retrieve, while the first client device maintains exclusive access to the at least one storage subsystem, the data chunk; and
perform, while the first client device maintains exclusive access to the at least one storage subsystem, a storage service on the data chunk in order to retrieve the first data that is stored in the cache subsystem.

10. The IHS of claim 7, wherein the orchestrator engine is configured to:
determine, while the first client device maintains exclusive access to the at least one storage subsystem and in response to receiving the first read request, that the first data is stored in the cache subsystem, wherein the first data is retrieved from the cache subsystem in response to determining that the first data is stored in the cache subsystem.

11. The IHS of claim 7, wherein the orchestrator engine is configured to:
receive, from the first client device while the first client device maintains exclusive access to the at least one storage subsystem, a second read request that is directed to second data that is stored in the at least one storage subsystem;
determine, while the first client device maintains exclusive access to the at least one storage subsystem and in response to receiving the second read request, that the second data is stored in the at least one storage subsystem;
retrieve, while the first client device maintains exclusive access to the at least one storage subsystem and in response to determining that the second data is stored in the at least one storage subsystem, the second data from the at least one storage subsystem; and
provide, while the first client device maintains exclusive access to the at least one storage subsystem, the second data to the first client device.

12. The IHS of claim 7, wherein the orchestrator engine is configured to:
present, to the first client device, the at least one storage subsystem as an emulated storage device.

13. The IHS of claim 7, wherein the orchestrator engine is configured to identify that the first client device has exclusive access to the at least one storage subsystem by:

receiving, from the at least one storage subsystem, a notification that the first client device has exclusive access to the at least one storage subsystem.

14. A method for providing data via a Logically Composed System (LCS), comprising:
- identifying, by an orchestrator device, that a first client device has exclusive access to at least one storage subsystem;
- activating, by the orchestrator device in response to identifying that the first client device has exclusive access to the at least one storage subsystem, read data caching for the at least one storage subsystem and, while the first client device maintains exclusive access to the at least one storage subsystem:
  - receiving, by the orchestrator device from the first client device, at least one first read request that is directed to first data that is stored in the at least one storage subsystem;
  - retrieving, by the orchestrator device in response to receiving the at least one first read request, the first data from a cache subsystem; and
  - providing, by the orchestrator device, the first data to the first client device;
- identifying, by the orchestrator device, that none of the plurality of client devices has exclusive access to the at least one storage subsystem; and
- deactivating, by the orchestrator device in response to determining that none of the plurality of client devices has exclusive access to the at least one storage subsystem, the read data caching for the at least one storage subsystem such that, while none of the plurality of client devices has exclusive access to the at least one storage subsystem, data identified in read requests that are received from any of the plurality of client devices and that are directed to the at least one storage subsystem is not retrieved from the cache subsystem.

15. The method of claim 14, further comprising:
- determining, by the orchestrator device while the first client device maintains exclusive access to the at least one storage subsystem and prior to receiving the at least one first read request, that the first data has been subject to read requests that exceed a data caching threshold; and
- storing, by the orchestrator device while the first client device maintains exclusive access to the at least one storage subsystem and in response to determining that the first data has been subject to the read requests that exceed the data caching threshold, the first data in the cache subsystem.

16. The method of claim 15, further comprising:
- identifying, by the orchestrator device in the at least one storage subsystem while the first client device maintains exclusive access to the at least one storage subsystem, a data chunk that includes the first data and that exceeds a storage service efficiency threshold;
- retrieving, by the orchestrator device while the first client device maintains exclusive access to the at least one storage subsystem, the data chunk; and
- performing, by the orchestrator device while the first client device maintains exclusive access to the at least one storage subsystem, a storage service on the data chunk in order to retrieve the first data that is stored in the cache subsystem.

17. The method of claim 14, further comprising:
- determining, by the orchestrator device while the first client device maintains exclusive access to the at least one storage subsystem and in response to receiving the first read request, that the first data is stored in the cache subsystem, wherein the first data is retrieved from the cache subsystem in response to determining that the first data is stored in the cache subsystem.

18. The method of claim 14, further comprising:
- receiving, by the orchestrator device from the first client device while the first client device maintains exclusive access to the at least one storage subsystem, a second read request that is directed to second data that is stored in the at least one storage subsystem;
- determining, by the orchestrator device while the first client device maintains exclusive access to the at least one storage subsystem and in response to receiving the second read request, that the second data is stored in the at least one storage subsystem;
- retrieving, by the orchestrator device while the first client device maintains exclusive access to the at least one storage subsystem and in response to determining that the second data is stored in the at least one storage subsystem, the second data from the at least one storage subsystem; and
- providing, by the orchestrator device while the first client device maintains exclusive access to the at least one storage subsystem, the second data to the first client device.

19. The method of claim 14, further comprising:
- presenting, by the orchestrator device to the first client device, the at least one storage subsystem as an emulated storage device.

20. The method of claim 14, wherein the orchestrator engine is configured to identify that the first client device has exclusive access to the at least one storage subsystem by:
- receiving, by the orchestrator device from the at least one storage subsystem, a notification that the first client device has exclusive access to the at least one storage subsystem.

* * * * *